(12) United States Patent
Yoshioka et al.

(10) Patent No.: US 12,205,749 B2
(45) Date of Patent: Jan. 21, 2025

(54) INDUCTOR COMPONENT AND MANUFACTURING METHOD FOR INDUCTOR COMPONENT

(71) Applicant: Murata Manufacturing Co., Ltd., Kyoto-fu (JP)

(72) Inventors: Yoshimasa Yoshioka, Nagaokakyo (JP); Takahiro Ogoshi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 719 days.

(21) Appl. No.: 17/409,923

(22) Filed: Aug. 24, 2021

(65) Prior Publication Data

US 2022/0068548 A1    Mar. 3, 2022

(30) Foreign Application Priority Data

Aug. 26, 2020   (JP) .................. 2020-142764

(51) Int. Cl.
| | |
|---|---|
| H01F 27/24 | (2006.01) |
| H01F 27/28 | (2006.01) |
| H01F 27/29 | (2006.01) |
| H01F 41/04 | (2006.01) |
| B33Y 80/00 | (2015.01) |

(52) U.S. Cl.
CPC ......... H01F 27/2804 (2013.01); H01F 27/24 (2013.01); H01F 27/292 (2013.01); H01F 41/041 (2013.01); *B33Y 80/00* (2014.12)

(58) Field of Classification Search
CPC .... H01F 27/2804; H01F 27/24; H01F 27/292; H01F 41/041; H01F 2017/0066; H01F 2017/0073; H01F 17/0013; H01F 41/00; B33Y 80/00; H05K 1/111
See application file for complete search history.

(56) References Cited

U.S. PATENT DOCUMENTS

| | | | |
|---|---|---|---|
| 2019/0206611 A1* | 7/2019 | Matsumoto | ............ H01F 17/04 |
| 2020/0027638 A1 | 1/2020 | Taguchi et al. | |
| 2020/0135374 A1 | 4/2020 | You et al. | |

FOREIGN PATENT DOCUMENTS

| | | |
|---|---|---|
| CN | 106992062 A | 7/2017 |
| CN | 110942904 A | 3/2020 |
| JP | 2019-121780 A | 7/2019 |

* cited by examiner

*Primary Examiner* — Tuyen T Nguyen
(74) *Attorney, Agent, or Firm* — Studebaker & Brackett PC

(57) ABSTRACT

A thin inductor component includes an element body having a principal surface and a side surface perpendicular to the principal surface. An inductor wire extends in parallel with the principal surface. From the inductor wire, a first vertical wire extends in a direction toward the principal surface, and a first support wire extends in parallel with the principal surface. The first vertical wire and the first support wire are connected to a first pad of the inductor wire. When a virtual tangent is drawn at a connection point of the inductor wire main body to the first pad with respect to the center axis of the wire main body when viewed from the thickness direction, the first support wire extends from the first pad in parallel with the virtual tangent and the center axis of the first support wire and the virtual tangent are located on different straight lines.

20 Claims, 13 Drawing Sheets

INDUCTOR COMPONENT AND MANUFACTURING METHOD FOR INDUCTOR COMPONENT

CROSS-REFERENCE TO RELATED APPLICATION

This application claims benefit of priority to Japanese Patent Application No. 2020-142764, filed Aug. 26, 2020, the entire content of which is incorporated herein by reference.

BACKGROUND

Technical Field

The present disclosure relates to an inductor component and a manufacturing method for an inductor component.

Background Art

In the inductor component disclosed in US Patent Application No. 2020/0135374, an insulating substrate is disposed in the inside of an element body. On both surfaces of the insulating substrate in the thickness direction, inductor wires are stacked. From the edge of the insulating substrate, a protrusion protrudes. The protrusion is a product integrated with the insulating substrate, and is located on the same layer as the insulating substrate. The tip end of the protrusion is exposed from the surface of the element body.

The inductor component is formed by cutting a mother substrate with a dicing machine, the mother substrate having a plurality of inductor components connected to each other. In the state of the mother board, the insulating substrates of the inductor components are connected to each other with a rod. When the mother substrate is cut with a dicing machine, the rod is cut to form the protrusion.

SUMMARY

In the technique disclosed in US Patent Application No. 2020/0135374, there are a high need for the rod body that supports and positions the inductor wires in the state of the mother substrate, and a high need for the protrusion that ensures the warpage and strength of the element body in the state of the inductor component after cut with a dicing machine. However, the thickness of the inductor component increases by the presence of the insulating substrate on which the rod body and the protrusion are formed. Therefore, it is considered that the insulating substrate is removed and the inductor wire itself is used as a substitute for the rod body and the protrusion. However, since the mechanical function demanded for the rod body and the protrusion is different from the electrical function demanded for the inductor wire, it is difficult to optimize both.

Accordingly, an aspect of the present disclosure provides an inductor component including an element body having a principal surface and a side surface vertical to the principal surface; an inductor wire extending in the element body in parallel with the principal surface; a vertical wire extending from the inductor wire in a thickness direction toward the principal surface, the vertical wire being exposed from the principal surface; and a support wire extending from the inductor wire in parallel with the principal surface. The support wire has an end portion exposed from the side surface. The inductor wire has a wire main body linearly extending, and a pad provided at an end portion of the wire main body, the pad being connected to the vertical wire and the support wire. The support wire is disposed on the pad on an opposite side of the wire main body. When viewed from the thickness direction, when a virtual tangent is drawn to a center axis of the wire main body at a connecting site of the wire main body to the pad, the support wire extends from the pad in parallel with the virtual tangent, and a center axis of the support wire and the virtual tangent are located on different straight lines.

According to the configuration, the inductor component includes the support wire extending from the pad in parallel with the wire main body. Therefore, it is possible to contribute to a reduction in the thickness of the inductor component in that an insulating substrate or the like for forming the rod body or the protrusion is unnecessary.

According to the configuration, the wire main body that ensures the electrical function and the support wire that ensures the mechanical function are separated by the pad as a boundary, and the virtual tangent of the wire main body and the center axis of the support wire are located on different straight lines. Thus, the electrical function and the mechanical function can be designed independently, and the contribution to optimizing both functions is enabled.

DETAILED DESCRIPTION

In the following, a first embodiment according to an inductor component will be described. It should be noted that the drawings sometimes show components in scaling up for easy understanding. The dimensions and ratios of the components sometimes different from those in other drawing.

Figure 1:
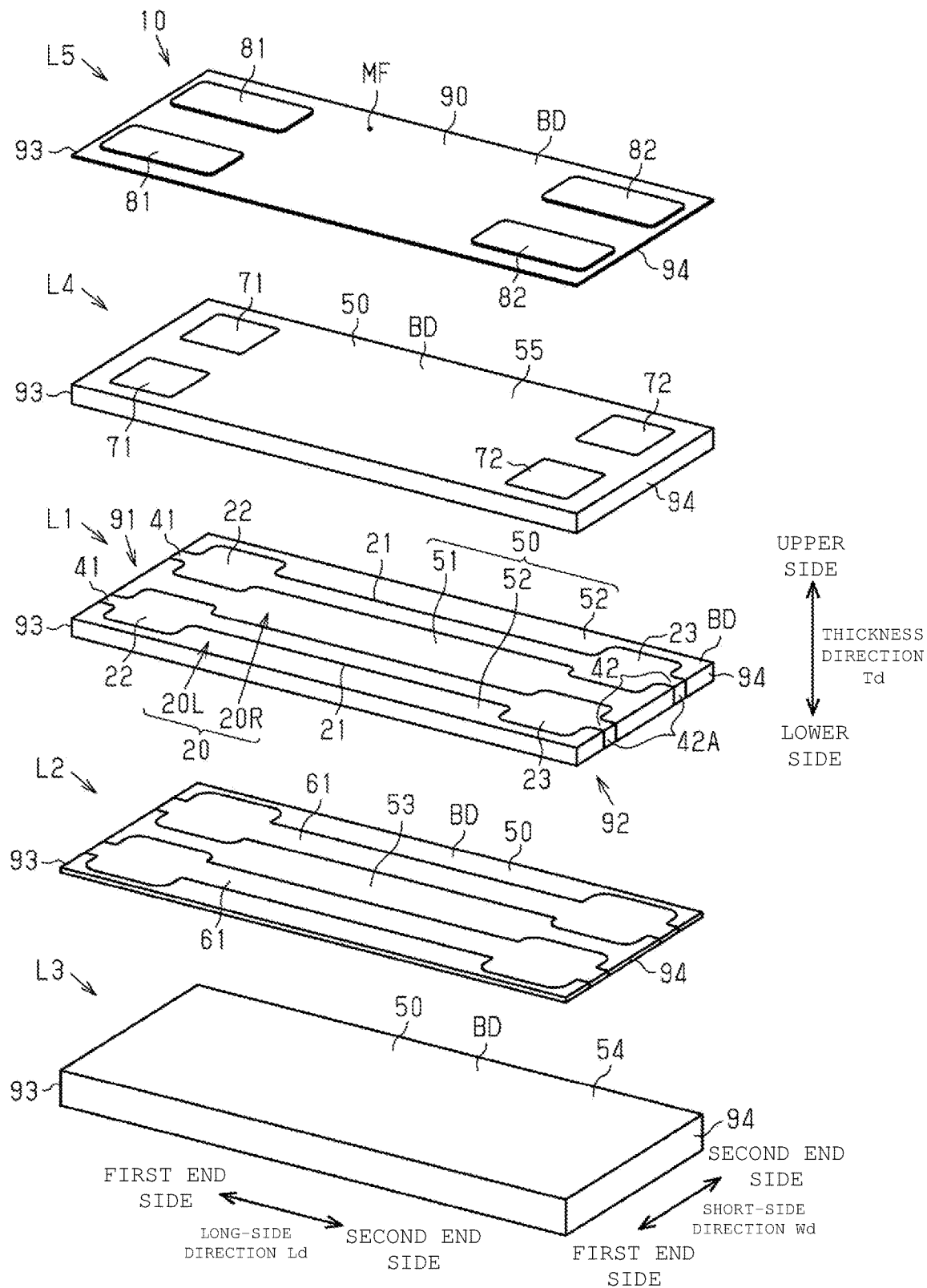
FIG. 1 is an exploded perspective view of an inductor component according to a first embodiment.

As shown in FIG. 1, an inductor component 10 has a structure such that five layers are stacked in a thickness direction Td as a whole. It should be noted that in the following description, one side in the thickness direction Td is defined as the upper side and the opposite side of the one side is defined as the lower side.

A first layer L1 is composed of two inductor wires 20, first support wires 41 individually extending from the inductor wires 20, a second support wire 42, an inner magnetic path 51, and an outer magnetic path 52. It should be noted that in the following description, these two inductor wires 20 have to distinguish from each other, one inductor wire 20 is referred to as a first inductor wire 20R, and another inductor wire 20 is referred to as a second inductor wire 20L.

The first layer L1 is in a rectangular shape when viewed from the thickness direction Td. It should be noted that a direction along the long side of the rectangular shape is defined as a long-side direction Ld, and a direction along the short side is defined as a short-side direction Wd.

The inductor wire 20 is composed of the wire main body 21 that linearly extends, and a first pad 22 and a second pad 23 individually provided at the end portions of the wire main body 21.

The wire main body 21 extends in the long-side direction Ld of the first layer L1. In the wire main body 21, the first pad 22 is connected to the first end on the first end side in the long-side direction Ld. The dimension of the first pad 22 in the short-side direction Wd is larger than the dimension of the wire main body 21 in the short-side direction Wd. The first pad 22 is in a nearly square shape when viewed from the thickness direction Td. In the wire main body 21, to the second end on the second end side in the long-side direction Ld, the second pad 23 is connected. The dimension of the second pad 23 in the short-side direction Wd is larger than the dimension of the wire main body 21 in the short-side direction Wd. The second pad 23 is in a nearly square shape the same as the first pad 22 when viewed from the thickness direction Td.

The inductor wire 20 is made of a conductive material. In the present embodiment, the inductor wire 20 can have a composition in which the ratio of copper is 99 wt % or more and the ratio of sulfur is 0.1 wt % or more 1.0 wt % or less (i.e., from 0.1 wt % to 1.0 wt %).

In the first layer L1, from the first pad 22 on the opposite side of the wire main body 21, a first support wire 41 extends. That is, the first support wire 41 extends from the edge of the first pad 22 on the first end side in the long-side direction Ld. The first support wire 41 linearly extends in parallel with the long-side direction Ld. The first support wire 41 extends to a first side surface 91 on the first end side in the long-side direction Ld of the first layer L1, and is exposed from the first side surface 91. It should be noted that two first support wires 41 are present corresponding to the number of the inductor wires 20, and these two first support wires 41 are exposed from the first side surface 91.

Similarly, in the first layer L1, from the second pad 23 on the opposite side of the wire main body 21, a second support wire 42 extends. That is, the second support wire 42 extends from the edge of the second pad 23 on the second end side in the long-side direction Ld. The second support wire 42 linearly extends in parallel with the long-side direction Ld. The second support wire 42 extends to a second side surface 92 on the second end side in the long-side direction Ld of the first layer L1, and is exposed from the second side surface 92. It should be noted that two second support wires 42 are present corresponding to the number of the inductor wires 20, and these two second support wires 42 are exposed from the second side surface 92.

The materials of the first support wire 41 and the second support wire 42 are conductive material the same as the material of the inductor wire 20. However, in the first support wire 41, a part including an exposed surface 41A exposed from the first side surface 91 is a Cu oxide. Similarly, in the second support wire 42, a part including an exposed surface 42A exposed from the second side surface 92 is a Cu oxide.

Figure 2:
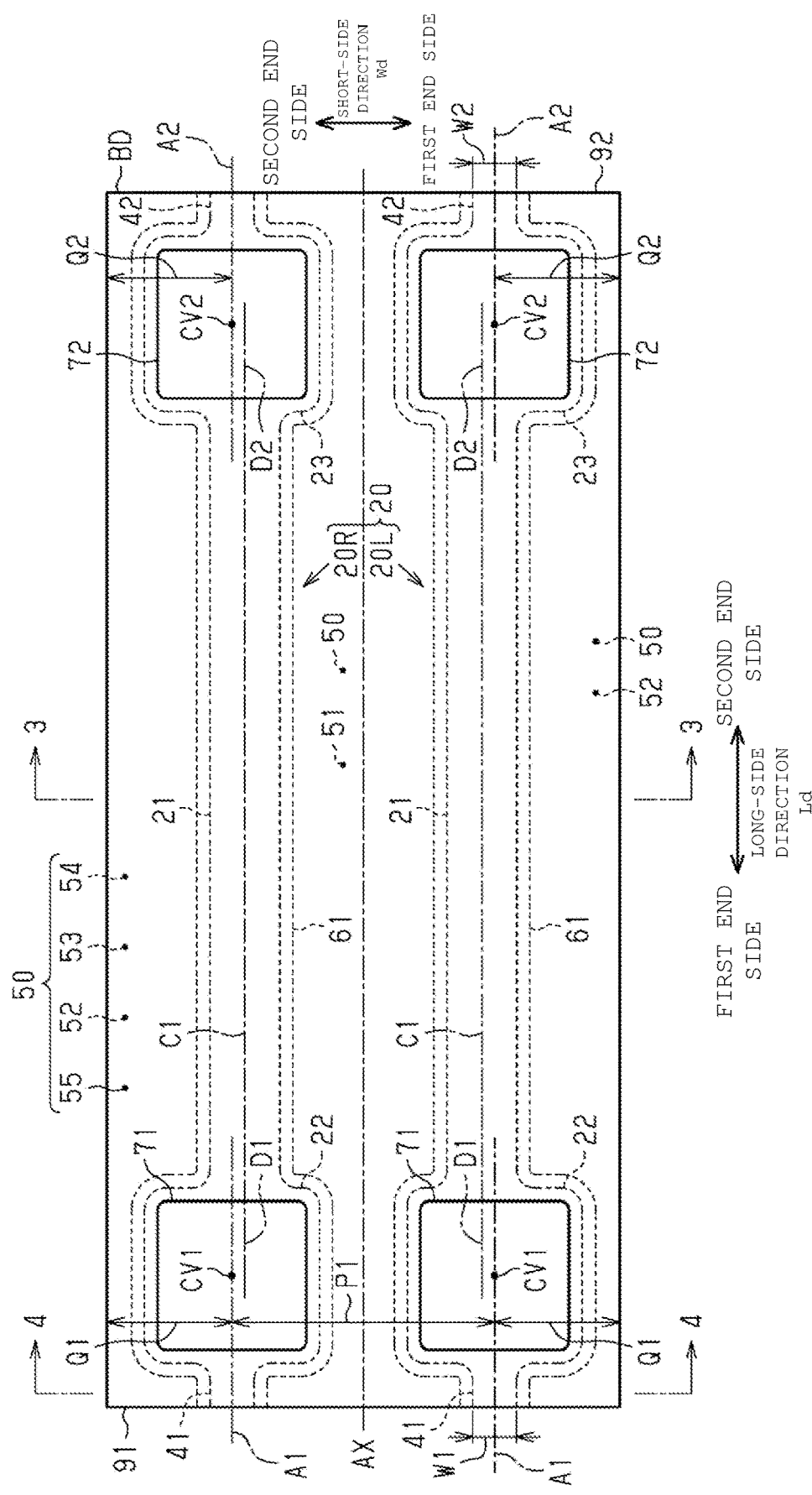
FIG. 2 is a transparent top view of the inductor component according to the first embodiment except a fifth layer.

As shown in FIG. 2, when a straight line passing the center of the first layer L1 in the short-side direction Wd and extending in the long-side direction Ld is a symmetry axis AX, the two inductor wires 20, the first support wire 41 extending from each of the inductor wires 20, and the second support wire 42 are disposed in line symmetry relative to the symmetry axis AX. That is, the two inductor wires 20 is present on the same plane. In this embodiment, the first support wire 41 extending from the first inductor wire 20R, and the second support wire 42 extending from the first inductor wire 20R are located on the second end side in the short-side direction Wd from the symmetry axis AX. The first support wire 41 extending from the second inductor wire 20L, and the second support wire 42 extending from the second inductor wire 20L are located on the first end side in the short-side direction Wd from the symmetry axis AX.

As shown in FIG. 1, in the first layer L1, the region between the first inductor wire 20R and the second inductor wire 20L is an inner magnetic path 51. The material of the inner magnetic path 51 is a magnetic material. Specifically, the material of the inner magnetic path 51 is a resin containing metal magnetic powder. In this embodiment, the metal magnetic powder is an organic resin containing metal magnetic powder made of an iron silica-based alloy or an amorphous alloy of an iron-silica-based alloy. The metal magnetic powder can have a mean particle size of approximately five micrometers.

It should be noted that in this embodiment, the particle size of the metal magnetic powder is the longest length of a line drawn from the edge to the edge in the sectional form the metal magnetic powder appearing in a section of the inner magnetic path 51 that is cut. The mean particle size is the mean of the particle sizes of the metal magnetic powder at three or more random points in the metal magnetic powder appearing in the section of the inner magnetic path 51 that is cut.

In the first layer L1, when viewed from the thickness direction Td, the region on the second end side in the short-side direction Wd from the first inductor wire 20R and the region on the first end side in the short-side direction Wd from the second inductor wire 20L are the outer magnetic path 52. The material of the outer magnetic path 52 is a magnetic material the same as the material of the inner magnetic path 51.

In the present embodiment, the dimension of the first layer L1 in the thickness direction Td, i.e., the dimensions of the inductor wire 20, the first support wire 41, and the second support wire 42 in the thickness direction Td can be approximately 40 micrometers.

On the under surface that is the surface of the first layer L1 on the lower side in the thickness direction Td, a second layer L2 in a rectangular shape the same as the shape of the first layer L1 when viewed from the thickness direction Td is stacked. The second layer L2 is composed of two insulating resins 61 and an insulating resin magnetic layer 53.

The insulating resin 61 covers the inductor wire 20, the first support wire 41, and the second support wire 42 from the lower side in the thickness direction Td. The insulating resin 61 is in a shape that covers a range slightly wider than the outer edges of the inductor wire 20, the first support wire 41, and the second support wire 42 when viewed from the thickness direction Td. As a result, the insulating resin 61 is in a belt shape extending in the long-side direction Ld of the second layer L2 as a whole. The material of the insulating resin 61 is an insulating resin, and in this embodiment, a polyimide-based resin, for example, can be used. The insulating resin 61 has insulating properties higher than those of those of the inductor wire 20. Two insulating resins 61 are provided side by side corresponding to the number and the arrangement of the inductor wires 20 in the short-side direction Wd.

In the second layer L2, parts except the two insulating resins 61 are the insulating resin magnetic layer 53. The material of the insulating resin magnetic layer 53 is a magnetic material the same as the materials of the inner magnetic path 51 and the outer magnetic path 52 described above.

On the under surface that is the surface of the second layer L2 on the lower side in the thickness direction Td, a third layer L3 in a rectangular shape the same as the shape of the second layer L2 when viewed from the thickness direction Td is stacked. The third layer L3 is a first magnetic layer 54. Therefore, the first magnetic layer 54 is disposed on the lower side from the inductor wire 20. The material of the first magnetic layer 54 is an organic resin containing metal magnetic powder the same as the materials of the inner magnetic path 51, the outer magnetic path 52, and the insulating resin magnetic layer 53.

On the other hand, on the top surface that is the surface of the first layer L1 on the upper side in the thickness direction Td, a fourth layer L4 in a rectangular shape the same as the shape of the first layer L1 when viewed from the thickness direction Td is stacked. The fourth layer L4 is composed of two first vertical wires 71, two second vertical wires 72, and a second magnetic layer 55.

The first vertical wire 71 is directly connected to the top surface of the first pad 22 of the inductor wire 20 with no other layer interposed therebetween. That is, to the first pad 22, the first vertical wire 71, the first end of the wire main body 21 and the first support wire 41 are connected.

The material of the first vertical wire 71 is a material the same as the material of the inductor wire 20. The first vertical wire 71 is in a regular quadrangular prism shape, and the axial direction of the regular quadrangular prism is matched with the thickness direction Td.

As shown in FIG. 2, when viewed from the thickness direction Td, the dimensions of the edges of the first vertical wire 71 in a square shape are slightly smaller than the dimensions of the edges of the first pad 22 in a square shape. Therefore, the area of the first pad 22 is larger than the area of the first vertical wire 71 at the connecting site to the first pad 22. It should be noted that when viewed from the upper side in the thickness direction Td, a center axis CV1 of the first vertical wire 71 is matched with the geometric center of the first pad 22 in a nearly square shape. Two first vertical wires 71 are provided corresponding to the number of the inductor wires 20.

As shown in FIG. 1, the second vertical wire 72 is directly connected to the top surface of the second pad 23 of the inductor wire 20 with no other layer interposed therebetween. That is, to the second pad 23, the second vertical wire 72, the second end of the wire main body 21 and the second support wire 42 are connected.

The material of the second vertical wire 72 is a material the same as the material of the inductor wire 20. The second vertical wire 72 is in a regular quadrangular prism shape, and the axial direction of the regular quadrangular prism is matched with the thickness direction Td.

As shown in FIG. 2, when viewed from the thickness direction Td, the dimensions of the edges of the second vertical wire 72 in a square shape are slightly smaller than the dimensions of the edges of the second pad 23 in a square shape. Therefore, the area of the second pad 23 is larger than the area of the second vertical wire 72 at the connecting site to the second pad 23. It should be noted that when viewed from the upper side in the thickness direction Td, a center axis CV2 of the second vertical wire 72 is matched with the geometric center of the second pad 23 in a nearly square shape. Two second vertical wires 72 are provided corresponding to the number of the inductor wires 20.

As shown in FIG. 1, in the fourth layer L4, parts except the two first vertical wires 71 and the two second vertical wires 72 are the second magnetic layer 55. Therefore, the second magnetic layer 55 is stacked on the top surfaces of the inductor wires 20 and the support wires 41 and 42. That is, the support wires 41 and 42 are directly in contact with the second magnetic layer 55. The material of the second magnetic layer 55 is a material the same as the material of the first magnetic layer 54 described above.

In the inductor component 10, the magnetic layer 50 is composed of the inner magnetic path 51, the outer magnetic path 52, the insulating resin magnetic layer 53, the first magnetic layer 54, and the second magnetic layer 55. The inner magnetic path 51, the outer magnetic path 52, the insulating resin magnetic layer 53, the first magnetic layer 54, and the second magnetic layer 55 are connected to each other, and surround the inductor wires 20. As described above, the magnetic layer 50 forms a closed magnetic circuit to the inductor wires 20. Therefore, the inductor wires 20 extend in the inside of magnetic layer 50. It should be noted that although the inner magnetic path 51, the outer magnetic path 52, the insulating resin magnetic layer 53, the first magnetic layer 54, and the second magnetic layer 55 are shown separately, these components are integrated as the magnetic layer 50, and a boundary is sometimes not confirmed.

On the top surface that is the surface of the fourth layer L4 on the upper side in the thickness direction Td, a fifth layer L5 in a rectangular shape the same as the shape of the fourth layer L4 when viewed from the thickness direction Td is stacked. The fifth layer L5 is composed of two first external terminals 81, two second external terminals 82, and an insulating layer 90.

The first external terminal 81 is directly connected to the top surface of the first vertical wire 71 with no other layer interposed therebetween. The first external terminal 81 is in a rectangular shape when viewed from the thickness direction Td, and is also located on the second magnetic layer 55. The long side of the rectangle of the first external terminal 81 extends in parallel with the long-side direction Ld of the fifth layer L5, and the short side extends in parallel with the short-side direction Wd of the fifth layer L5. Two first external terminals 81 are provided corresponding to the number of the inductor wires 20.

The second external terminal 82 is directly connected to the top surface of the second vertical wire 72 with no other layer interposed therebetween. The second external terminal 82 is in a rectangular shape when viewed from the thickness direction Td. The long side of the rectangle of the second external terminal 82 extends in parallel with the long-side direction Ld of the fifth layer L5, and the short side extends in parallel with the short-side direction Wd of the fifth layer L5.

In the fifth layer L5, parts except the two first external terminals 81 and the two second external terminals 82 are the insulating layer 90. In other words, in the top surface of the fourth layer L4, the range that is not covered with the two first external terminals 81 and the two second external terminals 82 is covered with the insulating layer 90 of the fifth layer L5. The insulating layer 90 has the insulating properties higher than those of the magnetic layer 50, and in the present embodiment, the insulating layer 90 is a solder resist. The dimension of the insulating layer 90 in the thickness direction Td is smaller than the dimensions of the first external terminal 81 and the second external terminal 82 in the thickness direction Td.

In the present embodiment, an element body BD is composed of the magnetic layer 50, the insulating resin 61, and the insulating layer 90. In the present embodiment, the dimension of the element body BD in the thickness direction Td is approximately 0.2 mm, for example.

In the surface of the element body BD, the surface of the insulating layer 90 on the upper side in the thickness direction Td is a principal surface MF. Therefore, the inductor wire 20 extends in parallel with the principal surface MF of the element body BD. The first vertical wire 71 extends in the thickness direction Td from the first pad 22 of the inductor wire 20 toward the principal surface MF. The first vertical wire 71 is exposed from the principal surface MF. The second vertical wire 72 extends in the thickness direction Td from the second pad 23 of the inductor wire 20 toward the principal surface MF. The second vertical wire 72 is exposed from the principal surface MF. It should be noted that as in the present embodiment, at least parts of the surfaces of the first vertical wire 71 and the second vertical wire 72 exposed from the principal surface MF are sometimes covered with the first external terminal 81 and the second external terminal 82.

The element body BD has a first side surface 93 vertical to the principal surface MF. It should be noted that the first side surface 91 of the first layer L1 is a part of the first side surface 93 of the element body BD. The element body BD has a second side surface 94 that is a side surface vertical to the principal surface MF and in parallel with the first side surface 93. It should be noted that the second side surface 92 of the first layer L1 is a part of the second side surface 94 of the element body BD. That is, the first support wire 41 extends from the inductor wire 20 in parallel with the principal surface MF, and the end portion is exposed from the first side surface 93 of the element body BD. Similarly, the second support wire 42 extends from the inductor wire 20 in parallel with the principal surface MF, and the end portion is exposed from the second side surface 94 the element body BD.

Next, the wires will be described in detail.

As shown in FIG. 2, when viewed from the thickness direction Td, center axes C1 of the two wire main bodies 21 extend in the long-side direction Ld in parallel with each other. It should be noted that the center axis C1 of the wire main body 21 is a line that follows the intermediate points of the wire main body 21 in the direction orthogonal to the direction in which the wire main body 21 extends, i.e., in the short-side direction Wd. The line width of the wire main bodies 21, i.e., the dimension in the short-side direction Wd can be 50 micrometers. In the following description, in the short-side direction Wd, a distance from the center axis C1 of the wire main body 21 of the first inductor wire 20R to the center axis C1 of the wire main body 21 of the second inductor wire 20L is set to the pitch between the wire main bodies 21. In the present embodiment, the pitch between the wire main bodies 21 is approximately 250 micrometers, for example. The gap between the wire main bodies 21 adjacent to each other, i.e., the distance between the wire main body 21 of the first inductor wire 20R on the first end side in the short-side direction Wd and the wire main body 21 of the second inductor wire 20L on the second end side in the short-side direction Wd shown in FIG. 2 is approximately 200 micrometers, for example. It should be noted that in the present embodiment, the minimum gap between the inductor wires 20 adjacent to each other is the gap between the first pads 22 and the gap between the second pads 23, and these gaps are both 50 micrometers or more.

It is assumed that a virtual tangent D1 is drawn as a tangent to the center axis C1 at a connection point between the wire main body 21 and the first pad 22 with respect to the center axis C1 of the wire main body 21 when viewed from the thickness direction Td. In the present embodiment, the center axis C1 and the virtual tangent D1 are located on the same straight line.

The center axis A1 of the first support wire 41 extends in parallel with the virtual tangent D1. It should be noted that the center axis A1 of the first support wire 41 is a line that follows the intermediate points of the first support wire 41 in the direction orthogonal to the direction in which the first support wire 41 extends, i.e., in the short-side direction Wd.

The center axis A1 of the first support wire 41 is located on the outer side in the short-side direction Wd from the virtual tangent D1. That is, the first support wire 41 extends from the first pad 22 in parallel with the virtual tangent D1, and the center axis A1 of the first support wire 41 and the virtual tangent D1 are located on different straight lines. The distance between the center axis A1 of the first support wire 41 and the virtual tangent D1 is 15 micrometers, for example.

When viewed from the thickness direction Td, the extension line of the center axis A1 of the first support wire 41 passes the center axis CV1 of the first vertical wire 71. That is, the extension line of the center axis A1 of the first support wire 41 passes the geometric center of the connection surface of the first vertical wire 71 to the first pad 22.

Similarly, it is assumed that a virtual tangent D2 is drawn as a tangent to the center axis C1 at a connection point between the wire main body 21 and the second pad 23 with respect to the center axis C1 of the wire main body 21 when viewed from the thickness direction Td. In the present embodiment, the center axis C1 and the virtual tangent D2 are located on the same straight line.

The center axis A2 of the second support wire 42 extends in parallel with the virtual tangent D2. It should be noted that the center axis A2 of the second support wire 42 is a line that follows the intermediate points of the second support wire 42 in the direction orthogonal to the direction in which the second support wire 42 extends, i.e., in the short-side direction Wd.

The center axis A2 of the second support wire 42 is located on the outer side in the short-side direction Wd from the virtual tangent D2. That is, the second support wire 42 extends from the second pad 23 in parallel with the virtual tangent D2, and the center axis A2 of the second support wire 42 and the virtual tangent D2 are located on different straight lines. The distance between the center axis A2 of the second support wire 42 and the virtual tangent D2 is 15 micrometers, for example.

The extension line of the center axis A2 of the second support wire 42 passes the center axis CV2 of the second vertical wire 72. That is, the extension line of the center axis A2 of the second support wire 42 passes the center of the connection surface of the second vertical wire 72 to the second pad 23.

The first support wire 41 and the second support wire 42 extending from the same inductor wire 20 are disposed at the same location in the short-side direction Wd. That is, the center axis A1 of the first support wire 41 and the center axis A2 of the second support wire 42 are located on the same straight line. It should be noted that in the present application, when a displacement is within 10% based on the minimum line width of the inductor wire 20, the center axes A1 and A2 are regarded as located on the same straight line. Specifically, the minimum line width of the inductor wire 20 in the present embodiment can be 50 micrometers that is the line width of the wire main body 21. Therefore, the term "located on the same straight line" in the present embodiment means the case in which the shortest distance between two axes is within five micrometers, and the term "located on the different straight line" means the case in which the shortest distance between two axes exceeds five micrometers.

As described above, in the first layer L1, the inductor wires 20, the first support wire 41, and the second support wires 42 are disposed in line symmetry relative to the symmetry axis AX. Therefore, as shown in FIG. 2, a distance Q1 from the end of the element body BD on the second end side in the short-side direction Wd to the center axis A1 of the first support wire 41 extending from the first inductor wire 20R is equal to a distance Q1 from the end of the element body BD on the first end side in the short-side direction Wd to the center axis A1 of the first support wire 41 extending from the second inductor wire 20L.

Similarly, a distance Q2 from the end of the element body BD on the second end side in the short-side direction Wd to the center axis A2 of the second support wire 42 extending from the first inductor wire 20R is equal to a distance Q2 from the end of the element body BD on the first end side in the short-side direction Wd to the center axis A2 of the second support wire 42 extending from the second inductor wire 20L. Since the center axis A1 of the first support wire 41 and the center axis A2 of the second support wire 42 are on the same straight line, the distance Q1 is equal to the distance Q2.

On the other hand, in the present embodiment, a pitch P1 from the center axis A1 of the first support wire 41 extending from the first inductor wire 20R to the center axis A1 of the first support wire 41 extending from the second inductor wire 20L in the short-side direction Wd is larger than the distance Q1 and the distance Q2 described above. Specifically, the pitch P1 is a length approximately twice the distance Q1 and the distance Q2.

Figure 3:
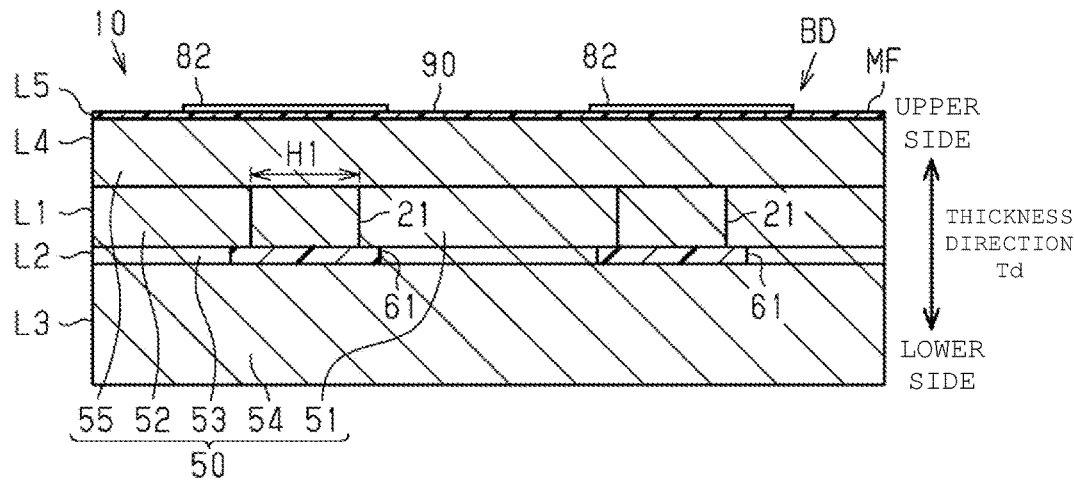
FIG. 3 is a sectional view of the inductor component taken along line 3-3 in FIG. 2.
Figure 4:
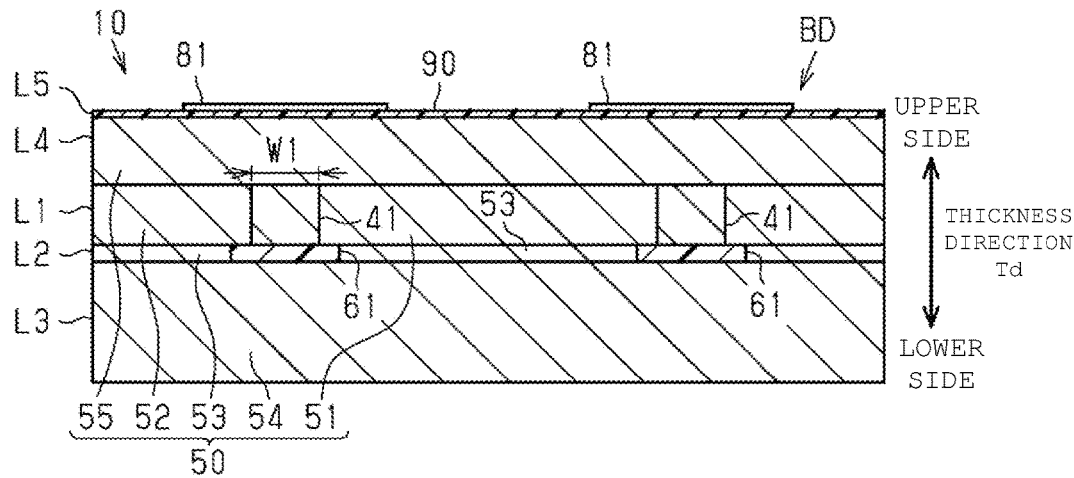
FIG. 4 is a sectional view of the inductor component taken along line 4-4 in FIG. 2.

As shown in FIGS. 3 and 4, a wire width W1 of the first support wire 41 in the short-side direction Wd is smaller than a wire width H1 of the wire main body 21 of the inductor wire 20 in the short-side direction Wd. Here, the first support wire 41 and the wire main body 21 of the inductor wire 20 are provided in the same first layer L1, and the dimensions in the thickness direction Td are substantially the same. Therefore, the sectional areas of the first support wires 41 are smaller than the sectional areas of the wire main bodies 21 in the reflection of the difference in the wire width. Similarly, as shown in FIGS. 2 and 3, the wire widths W2 of the second support wires 42 in the short-side direction Wd are smaller than the wire width H1 of the wire main body 21 of the inductor wire 20 in the short-side direction Wd Therefore, the sectional areas of the second support wires 42 are smaller than the sectional areas of the wire main bodies 21 in the reflection of the difference in the wire width.

Figure 5:
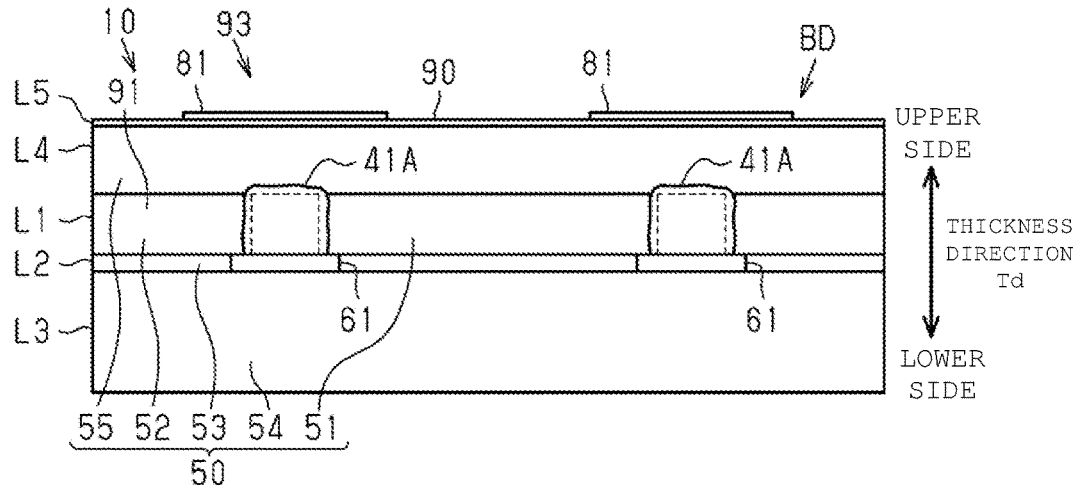
FIG. 5 is a side view showing the first side surface of the inductor component according to the first embodiment.

As shown in FIG. 5, from the first side surface 93 on the first end side in the long-side direction Ld of the element body BD, ends of the two first support wires 41 are exposed. The shapes of the exposed surfaces 41A of the first support wires 41 exposed from the first side surface 93 are in a shape slightly stretching the sectional form of the first support wire 41 orthogonal to the center axis A1. As a result, the area of the exposed surface 41A of the first support wire 41 is larger than the sectional area of the first support wire 41 in the inside of the element body BD in the section orthogonal to the center axis A1. Similarly, as shown in FIG. 1, the two second support wires 42 are both exposed from the second side surface 94 of the element body BD on the second end side in the long-side direction Ld. The area of the exposed surface 42A exposed from the second side surface 94 on the second support wire 42 is larger than the sectional area of the second support wire 42 in the inside of the element body BD in the section orthogonal to the center axis A2. Thus, the first support wire 41 has an increased contact area with the first side surface 93 of the element body BD, the second support wire 42 has an increased contact area with the second side surface 94 of the element body BD, and the close contact property of the support wires 41 and 42 to the element body BD is improved. It should be noted that the size of the sectional area only has to satisfy the relationship above, and for example, the exposed surface 41A may be in a shape in which the exposed surface 41A extends to one side and another side is covered with the extending part of the element body BD.

Next, a manufacturing method for an inductor component 10 according to the first embodiment will be described.

Figure 6:
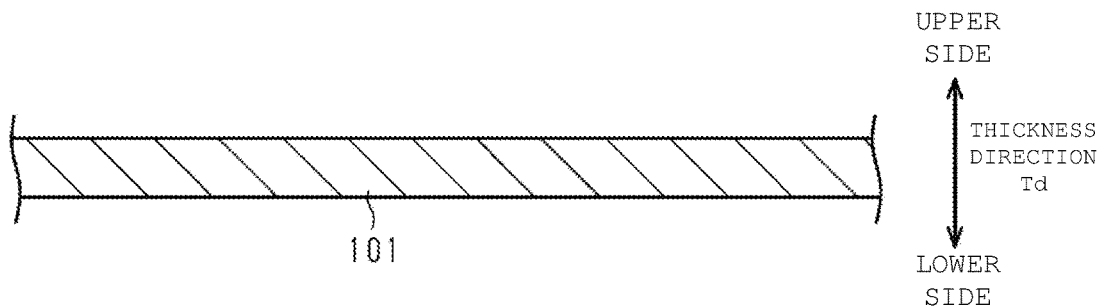
FIG. 6 is an explanatory diagram of the manufacturing method for the inductor component according to the first embodiment.

As shown in FIG. 6, first, a base member preparing step is performed. Specifically, a base member 101 in a plate shape is prepared. The base member 101 is made of ceramics. The base member 101 is in a rectangular shape when viewed from the thickness direction Td. The dimensions of edges are dimensions in which a plurality of the inductor components 10 is housed. In the following description, the description will be made as the direction orthogonal to the surface direction of the base member 101 is the thickness direction Td.

Figure 7:
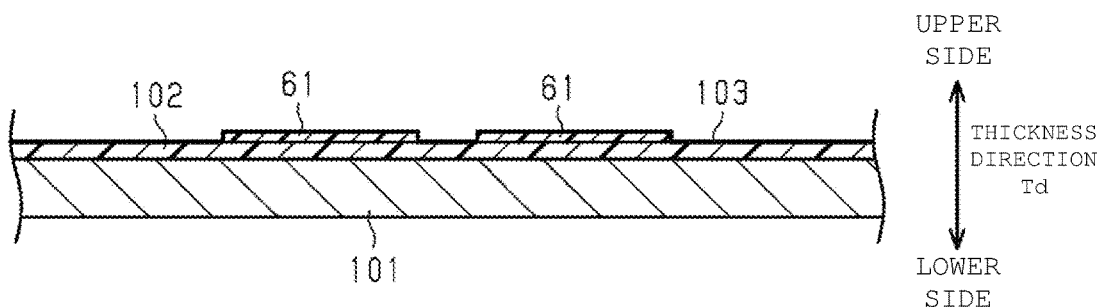
FIG. 7 is an illustration of a manufacturing method for an inductor component according to the first embodiment.

Subsequently, as shown in FIG. 7, the dummy insulating layer 102 is applied to throughout the top surface of the base member 101. Subsequently, when viewed from the thickness direction Td, the insulating resin 61 is patterned by photolithography in a range slightly wider than the range in which the inductor wire 20 is disposed.

Subsequently, a seed layer forming step of forming a seed layer 103 is performed. Specifically, the seed layer 103 made of copper is formed on the top surfaces of the insulating resin 61 and the dummy insulating layer 102 by sputtering from the top surface of the base member 101 side. It should be noted that in the drawings, the seed layer 103 is depicted by thick lines.

Figure 8:
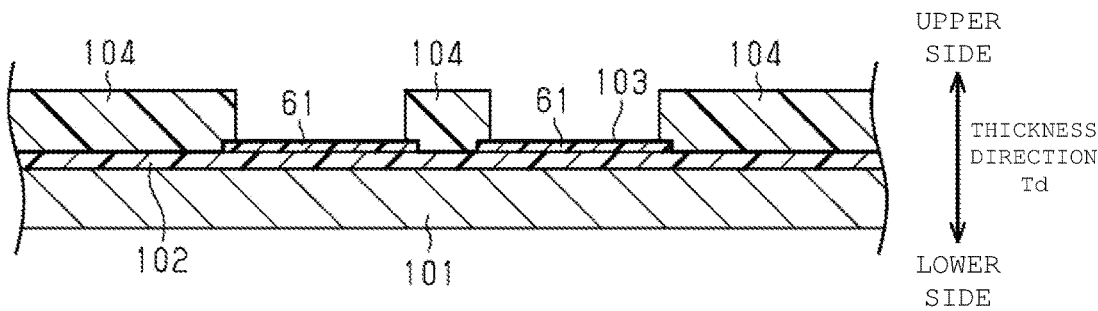
FIG. 8 is an explanatory diagram of the manufacturing method for an inductor component according to the first embodiment.

Subsequently, as shown in FIG. 8, a first covering step of forming a first covering part 104 that covers the parts of the top surface of the seed layer 103 on which the inductor wire 20, the first support wire 41, and the second support wire 42 are not formed is performed. Specifically, first, a photosensitive dry film resist is applied to throughout the top surface of the seed layer 103. Subsequently, in all the range of the top surface of the dummy insulating layer 102 and the top surface of the insulating resin 61, the top surface of the outer edge part in the range covered with the insulating resin 61 is cured by exposure. After that, in the applied dry film resist, the parts that are not cured are removed using a chemical solution. Thus, in the applied dry film resist, the cured parts are formed as the first covering part 104. On the other hand, from the parts of the applied dry film resist, which are removed using the chemical solution without forming the cover of the first covering part 104, the seed layer 103 is exposed. The thickness of the first covering part 104, which is the dimension of the first covering part 104 in the thickness direction Td is slightly larger than the thickness of the inductor wire 20 of the inductor component 10 in FIG. 3. It should be noted that photolithography in other steps, described later, are also similar steps, and the detailed description is omitted.

Figure 9:
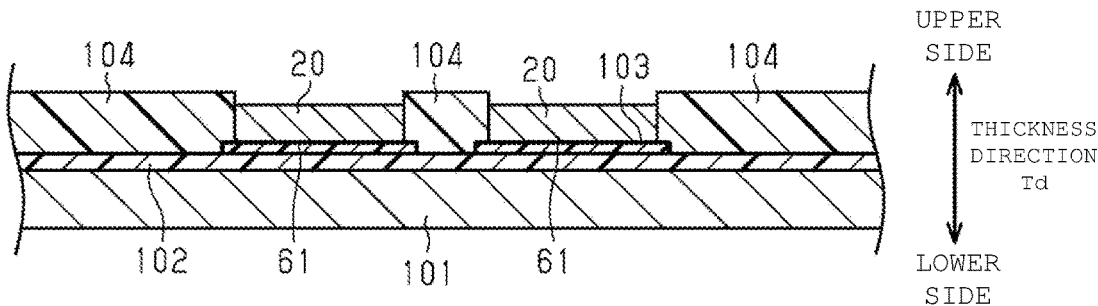
FIG. 9 is an explanatory diagram of the manufacturing method for an inductor component according to the first embodiment.

Subsequently, as shown in FIG. 9, a wire forming step of forming the inductor wire 20, the first support wire 41, and the second support wire 42 on the part of the top surface of the insulating resin 61 that is not covered with the first covering part 104 by electrolytic plating is performed. Specifically, on the top surface of the insulating resin 61, copper is grown from the parts from which the seed layer 103 is exposed using electrolytic copper plating. Thus, the inductor wire 20, the first support wire 41, and the second support wire 42 are formed. Therefore, in this embodiment, the step of forming the plurality of inductor wires 20 and the step of forming the plurality of first support wires 41 and the plurality of second support wires 42 that connect pads of different inductor wires to each other are the same step. The inductor wire 20, the first support wire 41, and the second support wire 42 are formed on the same plane. In FIG. 9, the inductor wire 20 is depicted, and the support wires is not depicted.

Figure 10:
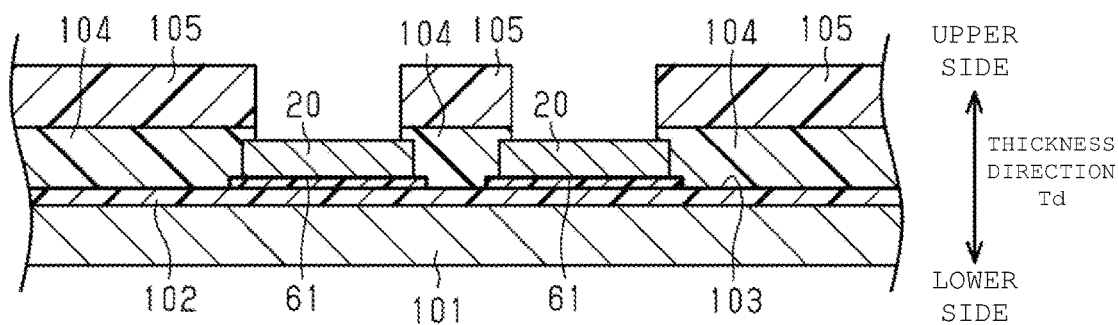
FIG. 10 is an explanatory diagram of the manufacturing method for an inductor component according to the first embodiment.

Subsequently, as shown in FIG. 10, a second covering step of forming a second covering part 105 is performed. The range in which the second covering part 105 is formed is the range in which the first vertical wire 71 and the second vertical wire 72 are not formed on all the top surface of the first covering part 104, the ranges of all the top surfaces of the support wires, and the range of the top surface of the inductor wire 20. In this range, the second covering part 105 is formed by photolithography the same as the method of forming the first covering part 104. The dimension of the second covering part 105 in the thickness direction Td is the same as the dimension of the first covering part 104.

Subsequently, a vertical wire processing step of forming the vertical wires 71 and 72 is performed. Specifically, on the inductor wire 20, the first vertical wire 71 and the second vertical wire 72 are formed by electrolytic copper plating on the parts that are not covered with the second covering part 105. Thus, the first vertical wire 71 and the second vertical wire 72 is formed in the thickness direction Td vertical to the plane on which the inductor wires 20, the first support wires 41, and the second support wires 42 are formed. In the vertical wire forming step, the setting is made such that the top end of growing copper is located slightly lower from the top surface of the second covering part 105. Specifically, the setting is made such that the dimensions of the vertical wires in the thickness direction Td before cut, described later, is the same as the dimensions of the inductor wires 20 in the thickness direction Td.

Figure 11:
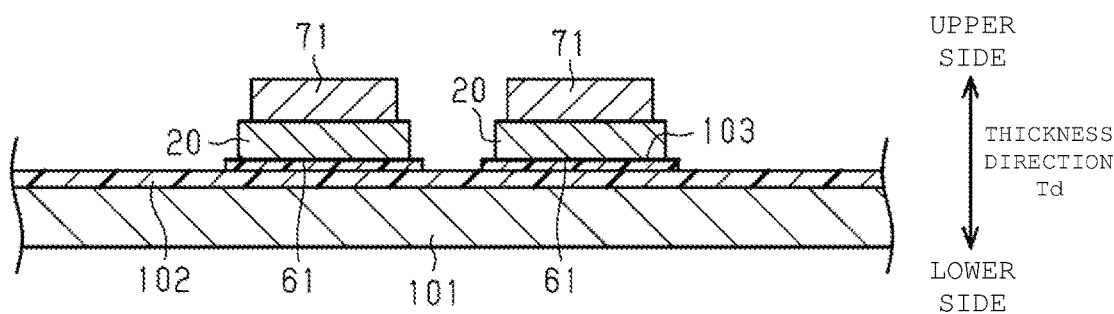
FIG. 11 is an explanatory diagram of the manufacturing method for an inductor component according to the first embodiment.

Subsequently, as shown in FIG. 11, a covering part removing step of removing the first covering part 104 and the second covering part 105 is performed. Specifically, the first covering part 104 and the second covering part 105 are wet-etched with a chemical, and the first covering part 104 and the second covering part 105 are peeled. It should be noted that in FIG. 11, the first vertical wire 71 is depicted, and the second vertical wire is not depicted.

Subsequently, a seed layer etching step of etching the seed layer 103 is performed. The seed layer 103 is etched, and the exposed seed layer 103 is removed. As described above, the inductor wires and the support wires are formed by semi-additive process (SAP).

Figure 12:
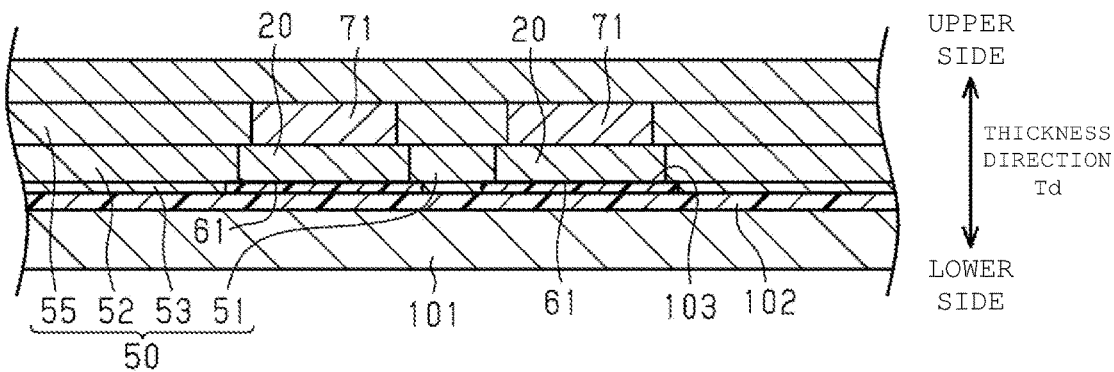
FIG. 12 is an explanatory diagram of the manufacturing method for an inductor component according to the first embodiment.

Subsequently, as shown in FIG. 12, a second magnetic layer forming step of stacking the inner magnetic path 51, the outer magnetic path 52, the insulating resin magnetic layer 53, and the second magnetic layer 55 is performed. Specifically, first, a resin containing magnetic powder that is the material of the magnetic layer 50 is applied to the top surface of the base member 101 side. At this time, the resin containing the magnetic powder is applied such that the top surfaces of the vertical wires are also covered. Subsequently, the resin containing the magnetic powder is compressed by press working, and the inner magnetic path 51, the outer magnetic path 52, the insulating resin magnetic layer 53, and the second magnetic layer 55 are formed on the top surface of the base member 101 side.

Figure 13:
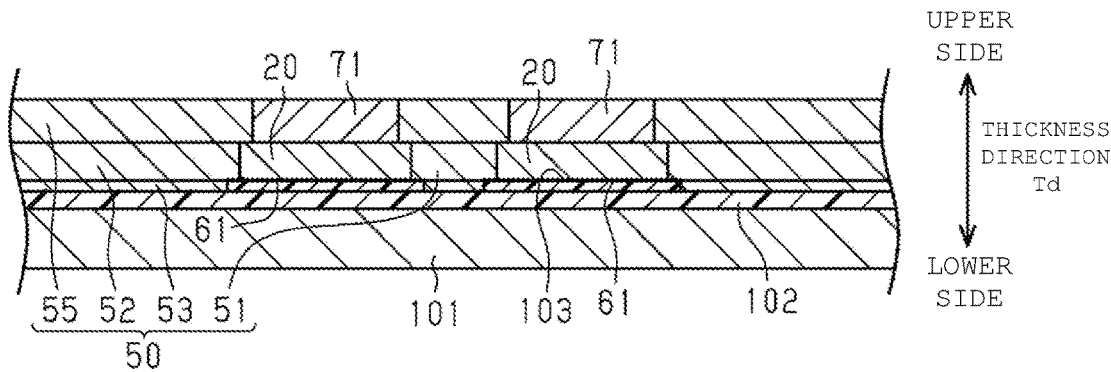
FIG. 13 is an explanatory diagram of the manufacturing method for an inductor component according to the first embodiment.

Subsequently, as shown in FIG. 13, the upper part of the second magnetic layer 55 is cut until the top surfaces of the vertical wires is exposed. It should be noted that although the inner magnetic path 51, the outer magnetic path 52, the insulating resin magnetic layer 53, and the second magnetic layer 55 are integrally formed, in the drawings, the inner magnetic path 51, the outer magnetic path 52, the insulating resin magnetic layer 53, and the second magnetic layer 55 are separately depicted.

Figure 14:
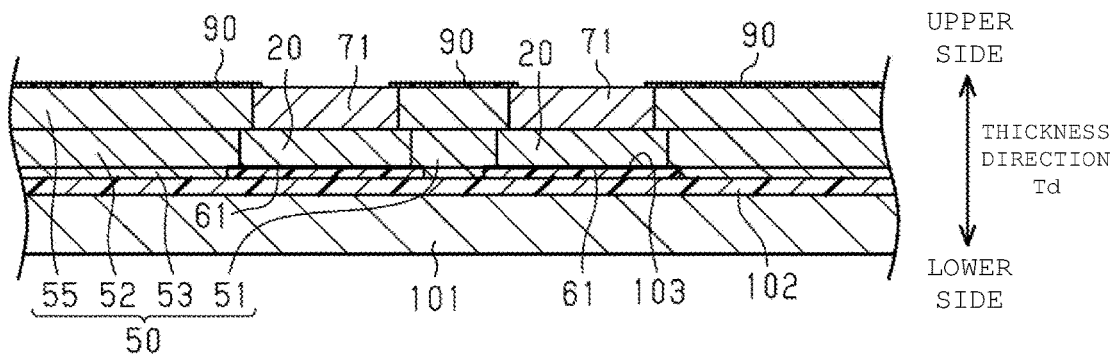
FIG. 14 is an explanatory diagram of the manufacturing method for an inductor component according to the first embodiment.

Subsequently, as shown in FIG. 14, an insulating layer forming step is performed. Specifically, on the parts on which no external terminal is formed on the top surface of the second magnetic layer 55 and the top surfaces of the vertical wires, a solder resist that functions as the insulating layer 90 is patterned by photolithography. It should be noted that in the present embodiment, the direction orthogonal to the top surface of the insulating layer 90, i.e., the principal surface MF of the element body BD is the thickness direction Td.

Figure 15:
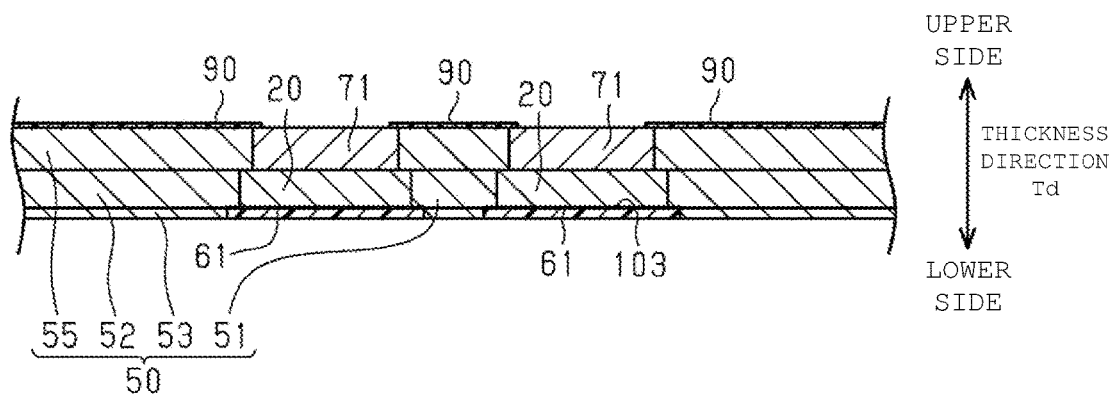
FIG. 15 is an explanatory diagram of the manufacturing method for an inductor component according to the first embodiment.

Subsequently, as shown in FIG. 15, a base member cutting step is performed. Specifically, the base member 101 and the dummy insulating layer 102 are all removed by cutting. It should be noted that as the result of cutting all the dummy insulating layer 102, although the lower parts of the insulating resins are locally cut, the inductor wires are not removed.

Figure 16:
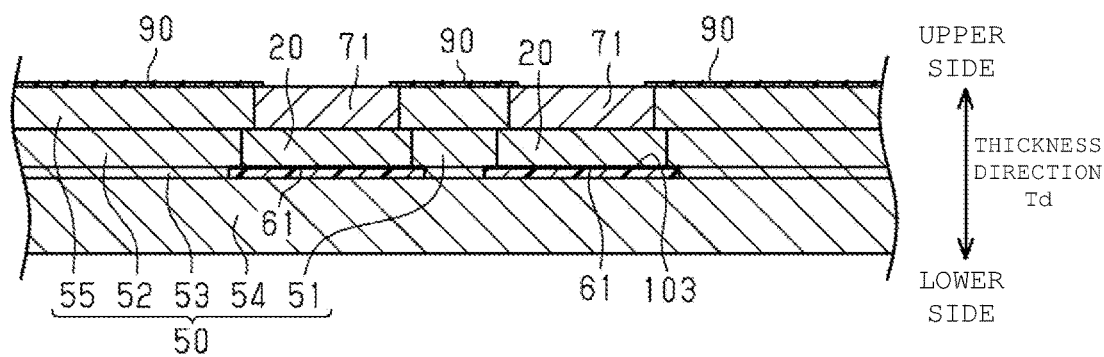
FIG. 16 is an explanatory diagram of the manufacturing method for an inductor component according to the first embodiment.

Subsequently, as shown in FIG. 16, a first magnetic layer forming step of stacking the first magnetic layer 54 is performed. Specifically, first, a resin containing magnetic powder that is the material of the first magnetic layer 54 is applied to the under surface of the base member 101. Subsequently, the resin containing the magnetic powder is compressed by press working, and the first magnetic layer 54 is formed on the under surface of the base member 101.

Subsequently, the lower end portion of the first magnetic layer 54 is cut. For example, the lower end portion of the first magnetic layer 54 is cut such that the dimensions from the top surfaces of the external terminals to the under surface of the first magnetic layer 54 have desired values.

Figure 17:
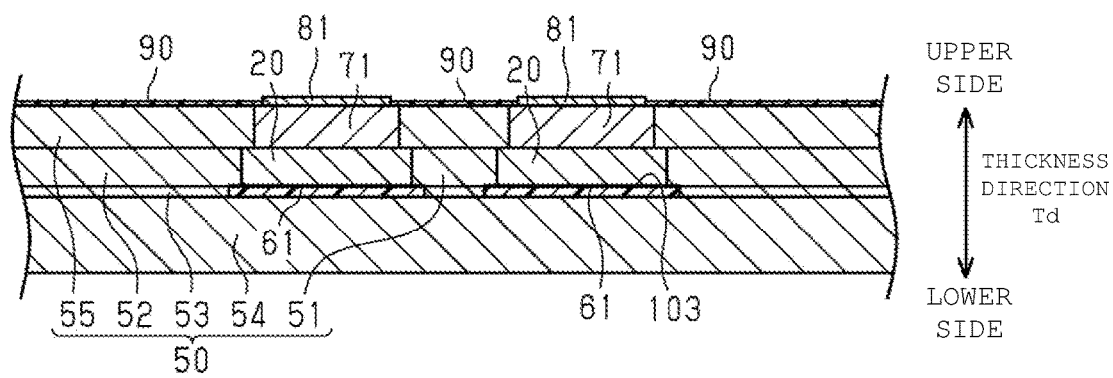
FIG. 17 is an explanatory diagram of the manufacturing method for an inductor component according to the first embodiment.

Subsequently, as shown in FIG. 17, a terminal part forming step is performed. Specifically, the first external terminal 81 and the second external terminal 82 are formed on the parts of the top surface of the second magnetic layer 55 and the top surface of the vertical wires 71 and 72, which are not covered with the insulating layer 90. In these metal layers, copper, nickel, and gold are formed by electroless plating. Between copper and nickel, a catalyst layer such as palladium may be provided. Thus, the first external terminal 81 and the second external terminal 82 having a three-layer structure are formed. In FIG. 17, the first external terminal 81 is depicted, and the second external terminal 82 is not depicted.

Figure 18:
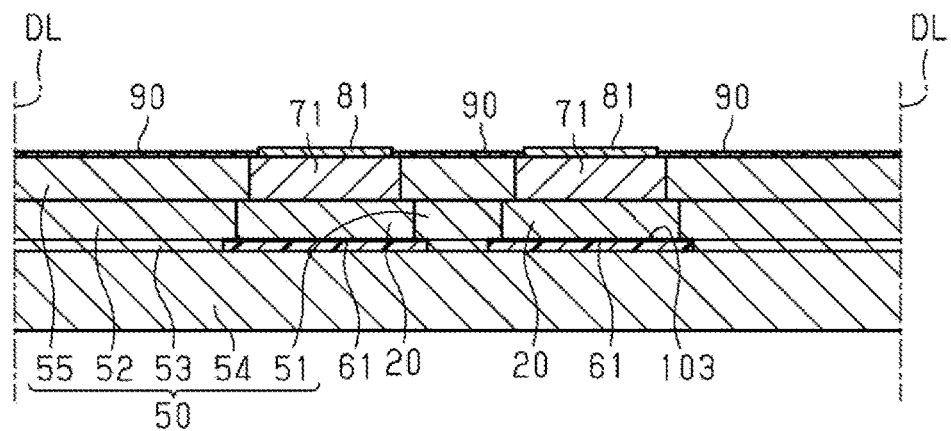
FIG. 18 is an explanatory diagram of the manufacturing method for an inductor component according to the first embodiment.

Subsequently, as shown in FIG. 18, a dicing step is performed. Specifically, die separation is performed by cutting with a dicing machine at break lines DL. As a result, the inductor component 10 can be obtained.

Figure 19:
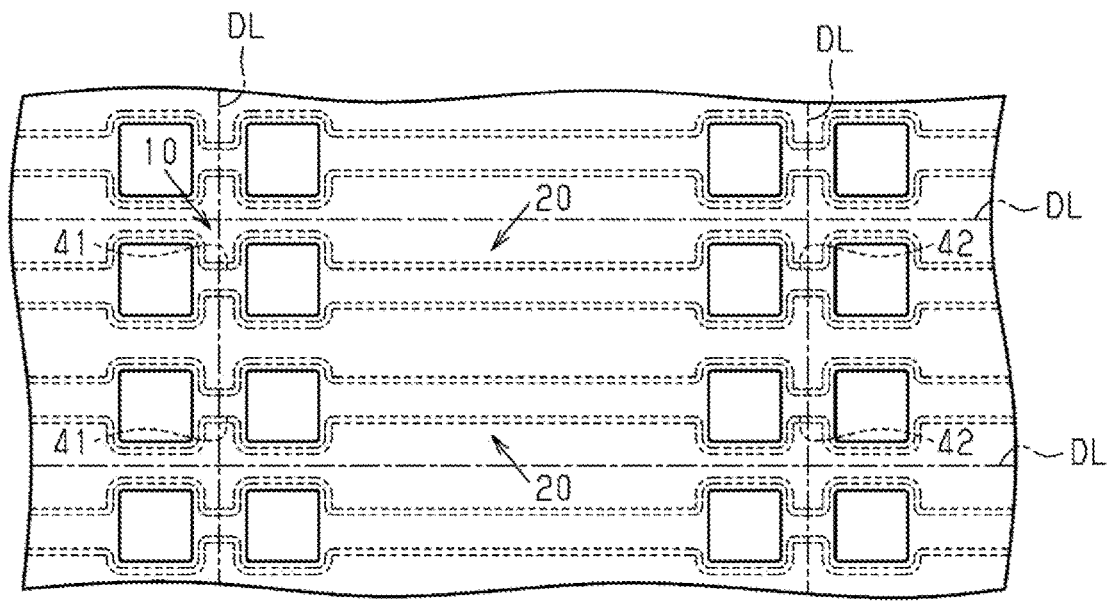
FIG. 19 is an explanatory diagram of the manufacturing method for an inductor component according to the first embodiment.

In the state before cutting with a dicing machine, for example, as shown in FIG. 19, a plurality of inductor components is arranged side by side in the long-side direction Ld and the short-side direction Wd, and the individual inductor components are connected by the element body BD, the first support wire 41, and the second support wire 42. The first support wires 41 and the second support wires 42 included on the break lines DL are cut in the thickness direction Td, and the section of the first support wire 41 is exposed as the exposed surface 41A from the first side surface 93. The cut surface of the second support wire 42 is exposed as an exposed surface 42A from the second side surface 94. In FIG. 19, the fifth layer L5 is omitted.

It should be noted that after the dicing step, the inductor components 10 are stood for a certain period under the presence of oxygen. Thus, the parts including the exposed surface 41A of the first support wire 41 and the parts including the exposed surface 42A of the second support wire 42 are oxidized to form Cu oxides.

Next, the operation of the first embodiment will be described.

As described above, in the dicing step, the first support wires 41 and the second support wires 42 included on the break lines DL are cut. In cutting the first support wire 41 and the second support wire 42, shearing stress is applied to the first support wire 41 and the second support wire 42. The support wires are deformed by the stress. Therefore, as shown in FIG. 5, the section on the first side surface 93 of the first support wire 41, i.e., the exposed surface 41A has a distorted shape. Similarly, the section of the second support wire 42 on the second side surface 94, i.e., the exposed surface 42A has a distorted shape.

Next, the effects of the first embodiment will be described.

(1-1) In the first embodiment, the inductor wire 20, the first support wire 41, and the second support wire 42 are present in the first layer L1. In the state in which the plurality of inductor components 10 is arranged side by side, i.e., in the state before cutting with a dicing machine, a configuration can be adopted in which the plurality of inductor wires is connected using the first support wire 41 and the second support wire 42. When the plurality of inductor wires 20 is connected using the first support wire 41 and the second support wire 42, these inductor wires 20 can be supported and positioned with no necessity of an insulating substrate or the like for supporting the inductor wire 20. Therefore, it is possible to contribute to a reduction in the thickness of the inductor component 10 in that an insulating substrate or the like for supporting the inductor wire 20 is unnecessary.

The center axis A1 of the first support wire 41 and the center axis C1 of the wire main body 21 of the inductor wire 20 are located on different straight lines. This is because the first support wire 41 and the inductor wire 20 have different purposes. Specifically, in the state in which the plurality of the inductor components 10 is arranged side by side before cutting with a dicing machine, for example, disposing the first support wires 41 at equal gaps is preferable for supporting and positioning the plurality of inductor wires 20. On the other hand, the inductor wire 20 has to be disposed at a position at which a desired inductance can be obtained in relation to the other inductor wire 20 and the magnetic layer 50 existing in the periphery. That is, in the embodiment, the wire main body 21 that ensures the electrical function is separated from the first support wire 41 that ensures the mechanical function, and the virtual tangent D1 of the wire main body 21 and the center axis A1 of the first support wire 41 are located on different straight lines Therefore, in the inductor component 10, the electrical function and the mechanical function can be designed independently, which contributes to the optimization of both functions. At this point, the same applies to the second support wire 42.

In the first embodiment, the first pad 22 is provided on the first end side in the long-side direction Ld of the wire main body 21, and the second pad 23 is provided on the second end side. The vertical wires 71 and 72 are directly connected from the pads 22 and 23. The inductor wires 20 connected to the vertical wires 71 and 72 are disposed on the same plane in the thickness direction Td. Therefore, it is possible to contribute to a reduction in the thickness of the inductor component 10 in the thickness direction Td rather than disposing the two inductor wires 20 to overlap each other in the thickness direction Td. The smaller the number of the inductor wires 20 disposed in the thickness direction Td becomes, the greater the influence of the positions of the wire main body 21, the first support wire 41, and the second support wire 42 becomes. Therefore, the effects of the first support wire 41 and the second support wire 42 described above can be remarkably obtained.

It is assumed that the center axis A1 of the first support wire 41 and the virtual tangent D1 are located on the same straight line, and the center axis A2 of the second support wire 42 and the virtual tangent D1 are located on the same straight line. In this state, when a torsion force is applied to the inductor component 10, the inductor wire 20, the first support wire 41, and the second support wire 42 can function as a center axis of torsion, and thus, it is difficult for the overall element body BD to resist the torsion force.

On the other hand, in the first embodiment, the center axis A1 of the first support wire 41 and the center axis C1 of the wire main body 21 are located on different straight lines, and the center axis A2 of the second support wire 42 and the center axis C1 of the wire main body 21 are also located on different straight lines. Therefore, the inductor wire 20, the first support wire 41, and the second support wire 42 as a whole do not function as the center axis of torsion, and the strength against the torsion force can be improved.

(1-2) In the first embodiment, the first support wire 41 is exposed from the first side surface 93. The second support wire 42 is exposed from the second side surface 94 extending in parallel with the first side surface 93. That is, these support wires are provided on both of the first end side and the second end side in the long-side direction Ld of the element body BD. Therefore, in the inductor component 10, the strength in the long-side direction Ld can be made uniform.

(1-3) In the first embodiment, the center axis A1 of the first support wire 41 and the center axis A2 of the second support wire 42 are located on the same straight line. That is, the first support wire 41 and the second support wire 42 are disposed in the same manner in the short-side direction Wd. Therefore, it is possible to avoid a situation in which the flow of the magnetic flux greatly changes between the first end side and the second end side in the long-side direction Ld of the element body BD due to the non-uniform arrangement of the first support wire 41 and the second support wire 42.

(1-4) In the first embodiment, the sectional area of the first support wire 41 is smaller than the sectional area of the wire main body 21. The smaller the sectional area of the first support wire 41 is, the smaller the load applied to the inductor component 10 at the time of cutting in the dicing step is, and the deformation of the inductor component 10 is less likely to occur at the time of cutting.

(1-5) In the first embodiment, as shown in FIG. 2, the pitch P1 is approximately twice the distance Q1 and the distance Q2. In the first embodiment, as shown in FIG. 19, before the die separation of the inductor components 10, a plurality of inductor components is arranged side by side in the long-side direction Ld and the short-side direction Wd, and the individual inductor components are connected with the element body BD and the support wires 41 and 42. In the state in which the inductor components are connected to each other, all pitches in the short-side direction Wd between the adjacent support wires are the pitch P1. According to the relationship between the distances Q1 and Q2 and the pitch P1 as described above, the support wires 41 and 42 are disposed at equal gaps with respect to the length of the overall mother board along the short-side direction Wd of the inductor components. When the mother substrate is cut along the break line DL, the support wires 41 and 42 are disposed at equal gaps, and thus a load at the time of cutting is easily uniformly distributed. Since the load is uniformly distributed, the deformation of the inductor component 10 caused at the time of cutting can be suppressed.

(1-6) In the first embodiment, the first vertical wire 71 is in a regular quadrangular prism shape. The extension line of the center axis A1 of the first support wire 41 passes the geometric center of the first vertical wire 71. The center axis CV1 of the first vertical wire 71 passes the center of the first vertical wire 71, and linearly extends in the thickness direction Td. Therefore, the center axis CV1 of the first vertical wire 71 and the center axis A1 of the first support wire 41 are present on the same plane. Therefore, the strength of the inductor component 10 can be expected to be improved to the force in the direction intersecting with the plane. At this point, the same applies to the second vertical wire 72.

(1-7) In the first embodiment, the exposed surface 41A of the first support wire 41 is made of a Cu oxide in the present embodiment. Since the exposed surface 41A is made of a Cu oxide, the conductivity is reduced on the exposed surface 41A. Therefore, supposing that another electric component is brought into contact with the exposed surface 41A, it is possible to suppress an electric current being carried through the exposed surface 41A. At this point, the same applies to the second support wire 42.

(1-8) In the first embodiment, the first magnetic layer 54 is stacked on the opposite side of the principal surface MF from the first layer L1 in the element body BD. In the element body BD, the second magnetic layer 55 is stacked on the principal surface MF side from the first layer L1. That is, the inductor wire 20 is sandwiched between the magnetic layers 50. Therefore, the acquisition efficiency of inductance of the inductor component 10 is easily ensured.

(1-9) According to the first embodiment, the material of the magnetic layer 50 is an organic resin containing Fe-based metal powder such as an iron silica-based alloy or metal magnetic powder made of an amorphous alloy of the iron silica-based alloy. Therefore, the acquisition efficiency of inductance of the inductor component 10 can be improved. The DC superposition properties of the inductor component 10 can be improved.

(1-10) In the first embodiment, the first support wire 41 and the second support wire 42 are in close contact with the second magnetic layer 55, i.e., the magnetic layer 50. Since the magnetic layer 50 is in close contact with the first support wire 41 and the second support wire 42, the volume of the magnetic layer 50 can be ensured, and the acquisition efficiency of the inductance of the inductor component 10 is easily ensured.

(1-11) In the first embodiment, the wire main body 21 of the inductor wire 20 is in a linear shape. In the case in which the wire main body 21 is in a linear shape, the wire length of the wire main body 21 is shorter than in the case in which the wire main body is in a curved shape. Since the wire length is short, it is easy to ensure the volumes of the inner magnetic path 51 and the outer magnetic path 52 disposed on the first layer L1. Since the wire main body 21 is in a linear shape, the direct current resistance of the wire main body 21 is small. As described above, the acquisition efficiency of inductance of the inductor component 10 is less likely to decrease. When the wire main body 21 is in a linear shape, the dimensions of the inductor component 10 are less likely to increase on the occasion in which the wire main bodies 21 are disposed side by side in the same layer as in the present embodiment, and it is easy to form a small inductor component.

(1-12) In the first embodiment, the area of the first pad 22 is larger than the area of the first vertical wire 71 at the connection point to the first pad 22. Therefore, supposing that the position of the first vertical wire 71 is displaced due to a manufacturing error, the overall contact surface of the first vertical wire 71 with the first pad 22 is easily brought into contact with the first pad 22. At this point, the same applies to the second vertical wire 72.

(1-13) In the first embodiment, the dimension of the element body BD in the thickness direction Td is approximately 0.2 mm. The smaller the dimension of the element body BD in the thickness direction Td becomes, the smaller the dimension protruding from the substrate in mounting the inductor component 10 on the substrate becomes. Therefore, the inductor component 10 according to the first embodiment is also mountable on a site at which the inductor component 10 in a large size in the thickness direction Td has not be mountable.

(1-14) It is assumed that when the dimension of the first support wire 41 in the thickness direction Td is too small, it is difficult for the first support wire 41 to play a role of connecting, supporting, and positioning the inductor wires 20 in the state in which the plurality of inductor components 10 before cutting is arranged side by side. On the other hand, when the dimension of the first support wire 41 in the thickness direction Td is too large, the load in dicing increases. Therefore, the dimension of the first support wire 41 in the thickness direction Td is preferably one-tenth or more and one-third or less (i.e., from one-tenth to one-third) with respect to the dimension of the element body BD in the thickness direction Td. In the first embodiment, the dimension of the first support wire 41 in the thickness direction Td is preferably approximately 40 micrometers, which is one-fifth of the dimension of the element body BD in the thickness direction Td. At this point, the same applies to the second support wire 42.

(1-15) In the first embodiment, the first magnetic layer 54 and the second magnetic layer 55 are organic resins containing metal magnetic powder. The metal magnetic powder is an alloy containing iron, and the mean particle size of the metal magnetic powder is approximately five micrometers. With the use of the magnetic powder having a small particle size of 10 micrometers or less in this manner, it is possible to reduce the iron loss while ensuring the relative permeability of the first magnetic layer 54 and the second magnetic layer 55.

(1-16) In the first embodiment, the pitch in the short-side direction Wd from the center axis C1 of the wire main body 21 of the first inductor wire 20R to the center axis C1 of the wire main body 21 of the second inductor wire 20L is approximately 250 micrometers. This is twice or more the minimum distance of the distance from the first support wire 41 to the end of the first side surface 91 in the short-side direction Wd and the distance from the second support wire 42 to the end of the second side surface 92 in the short-side direction Wd. Thus, an easy design is achieved such that the pitch is relatively large and the dimensions between the wire main bodies 21 are large, and the acquisition efficiency of the inductance value can be improved.

In the first embodiment, the gap between the first pads 22 and the gap between the second pads 23, which are the minimum gaps between the inductor wires 20 adjacent to each other, are approximately 50 micrometers or more. This is suitable for ensuring insulation between the inductor wires 20. Furthermore, a particle size of approximately 100 micrometers or more is still preferable.

(1-17) In the first embodiment, the step of forming the plurality of inductor wires 20 is the same as the step of forming the plurality of first support wires 41 and the plurality of second support wires 42. That is, the first support wire 41 and the second support wire 42 can be formed without adding a process. Since the number of steps does not increase, an increase in cost for forming the inductor component 10 can be suppressed.

In the following, a second embodiment of the inductor component will be described. It should be noted that the drawings sometimes show components in scaling up for easy understanding. The dimensions and ratios of the components sometimes different from those in other drawing. The description of configurations similar to those of the first embodiment is sometimes simplified or omitted.

Figure 20:
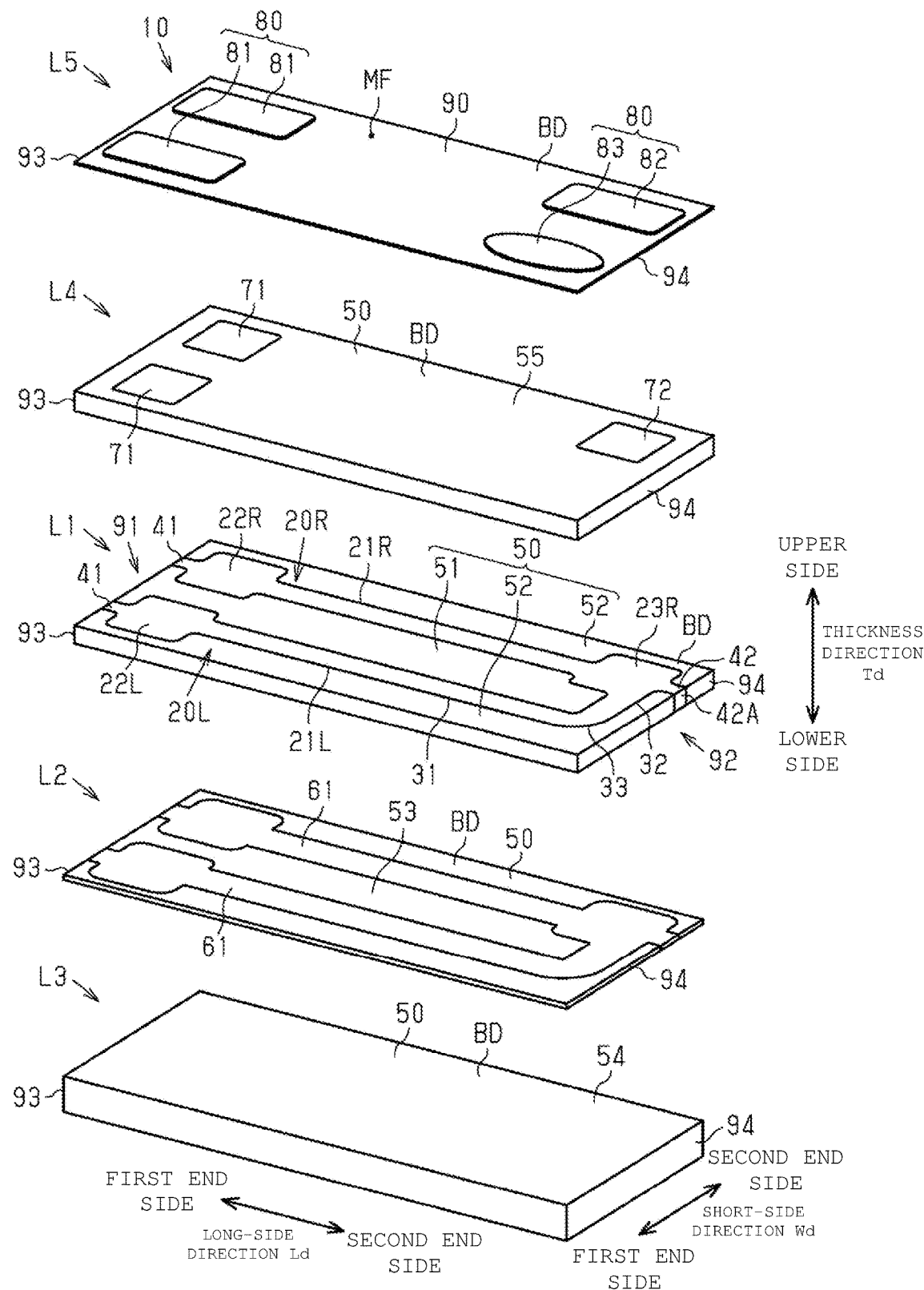
FIG. 20 is an exploded perspective view of an inductor component according to a second embodiment.

As shown in FIG. 20, the inductor component 10 has a structure such that five layers are stacked in the thickness direction Td as a whole. It should be noted that in the following description, one side in the thickness direction Td is defined as the upper side and the opposite side of the one side is defined as the lower side.

A first layer L1 is composed of a first inductor wire 20R, a second inductor wire 20L, a first support wire 41, a second support wire 42, an inner magnetic path 51, and an outer magnetic path 52.

The first layer L1 is in a rectangular shape when viewed from the thickness direction Td. It should be noted that a direction along the long side of the rectangular shape is defined as a long-side direction Ld, and a direction along the short side is defined as a short-side direction Wd.

The first inductor wire 20R is composed of a first wire main body 21R, a first pad 22R provided at a first end of the first wire main body 21R, and a second pad 23R provided at a second end of the first wire main body 21R.

The first wire main body 21R extends linearly in the long-side direction Ld of the first layer L1. In the first wire main body 21R, the first pad 22R is connected to the first end on the first end side in the long-side direction Ld. The dimension of the first pad 22R in the short-side direction Wd is larger than the dimension of the first wire main body 21R in the short-side direction Wd. The first pad 22R is in a nearly square shape when viewed from the thickness direction Td. In the first wire main body 21R, the second pad 23R is connected to the second end on the second end side in the long-side direction Ld. The dimension of the second pad 23R in the short-side direction Wd is larger than the dimension of the first wire main body 21R in the short-side direction Wd. The second pad 23R is in a nearly square shape the same as the first pad 22R when viewed from the thickness direction Td. It should be noted that the first inductor wire 20R is disposed close to the first layer L1 on the second end side in the short-side direction Wd.

The second inductor wire 20L is composed of the second wire main body 21L, the first pad 22L provided at the first end of the second wire main body 21L, and the second pad 23R provided at the second end of the second wire main body 21L.

The second wire main body 21L has two linear parts and a part connecting the two linear parts, and extends in an L shape as a whole. Specifically, the second wire main body 21L is composed of a long linear part 31 extending in the long-side direction Ld, a short linear part 32 extending in the short-side direction Wd, and a connection part 33 connecting these parts to each other.

Figure 21:
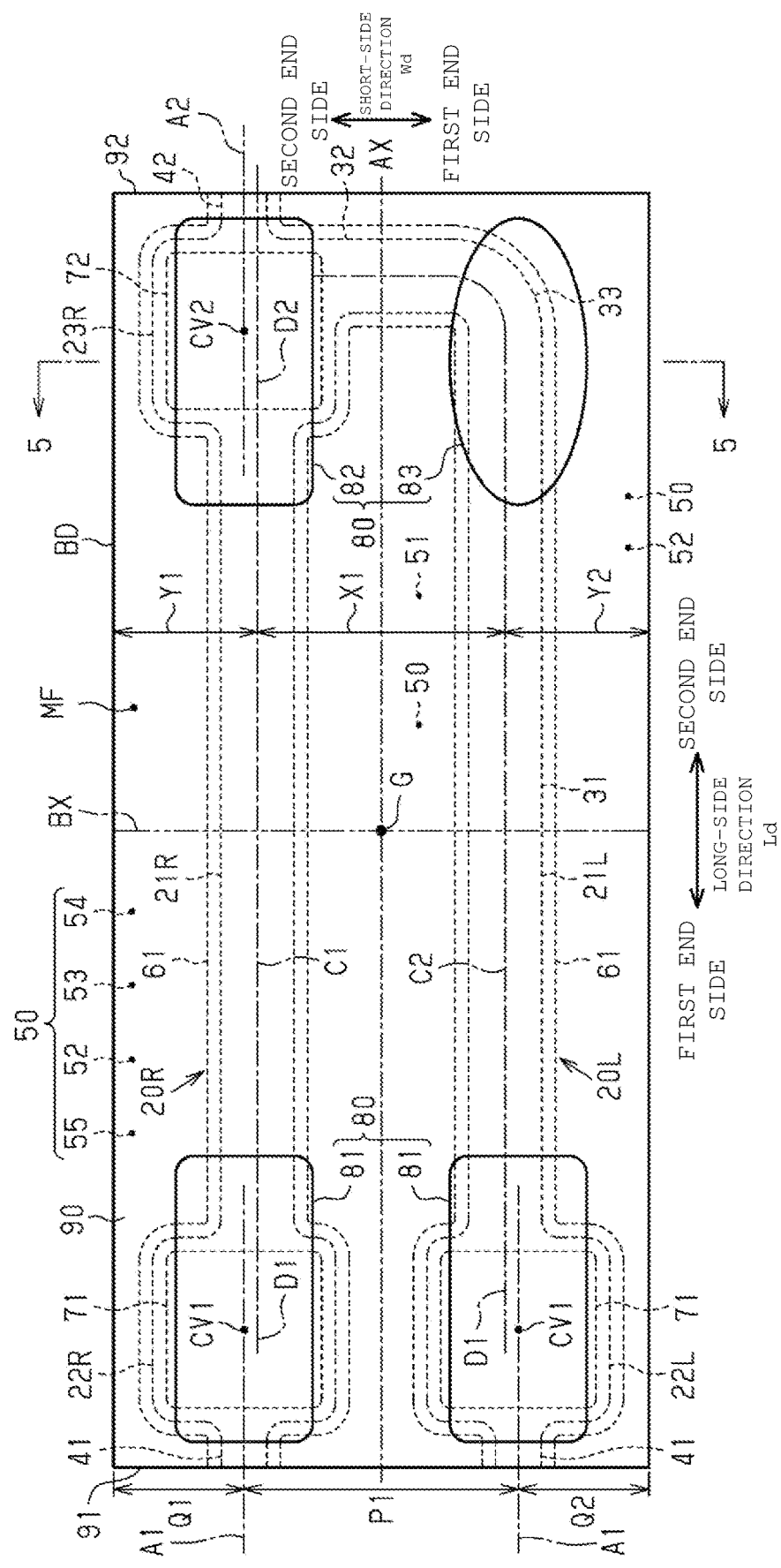
FIG. 21 is a transparent top view of the inductor component according to the second embodiment.

As shown in FIG. 21, when a straight line passing the center of the first layer L1 in the short-side direction Wd and extending in the long-side direction Ld is a symmetry axis AX, the long linear part 31 is disposed at a position in line symmetry to the first wire main body 21R, relative to the symmetry axis AX. The length of the long linear part 31 extending in the long-side direction Ld is slightly longer than the length of the first wire main body 21R extending in the long-side direction Ld. The dimension of the long linear part 31 in the short-side direction Wd is equal to the dimension of the first wire main body 21R in the short-side direction Wd. The end of the long linear part 31 on the first end side in the long-side direction Ld is connected to the first pad 22R. The second end on the second end side in the long-side direction Ld of the long linear part 31 is connected to the first end of the connection part 33.

The second end of the connection part 33 that is not connected to the long linear part 31 is directed to the second end side in the short-side direction Wd. That is, in the second wire main body 21L, the connection part 33 is curved at an angle of 90 degrees from the first direction in the long-side direction Ld toward the second end side in the short-side direction Wd.

The second end of the connection part 33 directed to on the second end side in the short-side direction Wd is connected to the first end of the short linear part 32. The dimension of the short linear part 32 in the long-side direction Ld is equal to the dimension of the long linear part 31 in the short-side direction Wd. The second end of the short linear part 32 directed to the second end side in the short-side direction Wd is connected to the second pad 23R that is connected to the first wire main body 21R. That is, the second pad 23R of the first inductor wire 20R is the same pad as the second pad 23R of the second inductor wire 20L.

The number of turns of the second inductor wire 20L is determined based on a virtual vector. The starting point of the virtual vector is disposed on the center axis C2 extending in the direction of extending the second wire main body 21L through the center of the wire width of the second wire main body 21L. Then, when the virtual vector is moved from the state in which the starting point of the second wire main body 21L is disposed at the first end to the second end of the center axis C2 when viewed from the thickness direction Td, the number of turns is determined as 1.0 turns when the angle at which the direction of the virtual vector is rotated is 360 degrees. However, in the case in which the direction of the virtual vector is wound a plurality of times, the number of turns is assumed to increase in the case in which the virtual vector is continuously wound in the same direction. In the case in which the virtual vector is wound in a direction different from the direction of the previous winding, the number of turns is counted again from zero turns. For example, in the case in which the virtual vector is wound clockwise at an angle of 180 and then wound counterclockwise at an angle of 180, the number of turns is 0.5 turns. In the present embodiment, the orientation of the virtual vector virtually disposed on the second wire main body 21L is rotated at an angle of 90 at the connection part 33. Therefore, the number of turns at which the second wire main body 21L is wound is 0.25 turns. It should be noted that the center axis C2 of the second wire main body 21L is a line that follows the intermediate points of the second wire main body 21L in the direction orthogonal to the direction in which the second wire main body 21L extends. That is, the center axis C2 of the second wire main body 21L is in a nearly L shape when viewed from the thickness direction Td.

As shown in FIG. 21, the first pad 22L is connected to the first end of the long linear part 31 of the second wire main body 21L on the first end side in the long-side direction Ld. The first pad 22L is in a shape the same as the shape of the first pad 22R connected to the first wire main body 21R. That is, the first pad 22L is in a nearly square shape when viewed from the thickness direction Td. The first pad 22L is disposed in line symmetry to the first pad 22R connected to the first wire main body 21R relative to the symmetry axis AX.

In the first layer L1, from the first pad 22R on the opposite side of the first wire main body 21R, the first support wire 41 extends. That is, the first support wire 41 extends from the edge of the first pad 22R on the first end side in the long-side direction Ld. The first support wire 41 linearly extends in parallel with the long-side direction Ld. The first support wire 41 extends to a first side surface 91 on the first end side in the long-side direction Ld of the first layer L1, and is exposed from the first side surface 91. Similarly, on the first layer L1, the first support wire 41 also extends from the first pad 22L on the opposite side of the second wire main body 21L.

In the first layer L1, from the second pad 23R on the opposite side of the first wire main body 21R, the second support wire 42 extends. That is, the second support wire 42 extends from the edge of the second pad 23R on the second end side in the long-side direction Ld. The second support wire 42 linearly extends in parallel with the long-side direction Ld. The second support wire 42 extends to a second side surface 92 on the second end side in the long-side direction Ld of the first layer L1, and is exposed from the second side surface 92. It should be noted that in the present embodiment, no support wire is provided on the opposite side of the second pad 23R to the short linear part 32 of the second wire main body 21L.

The first inductor wire 20R and the second inductor wire 20L are made of a conductive material. In the present embodiment, the composition of the first inductor wire 20R and the second inductor wire 20L can be such that the copper ratio is 99 wt % or more and the sulfur ratio is 0.1 wt % or more and 1.0 wt % or less (i.e., from 0.1 wt % to 1.0 wt %).

The materials of the first support wire 41 and the second support wire 42 are a conductive material the same as the materials of the first inductor wire 20R and the second inductor wire 20L. However, in the first support wire 41, a part including an exposed surface 41A exposed from the first side surface 91 is a Cu oxide. Similarly, in the second support wire 42, a part including an exposed surface 42A exposed from the second side surface 92 is a Cu oxide.

As shown in FIG. 20, in the first layer L1, a region between the first inductor wire 20R and the second inductor wire 20L is an inner magnetic path 51. The material of the inner magnetic path 51 is an organic resin containing metal magnetic powder. In this embodiment, the metal magnetic powder is metal magnetic powder made of an Fe-based alloy or an amorphous alloy of the Fe-based alloy. More specifically, the metal magnetic powder is an FeSiCr-based metal powder containing iron. The mean particle size of the metal magnetic powder can be approximately five micrometers. It should be noted that the mean particle size is handled the same as in the first embodiment.

In the first layer L1, when viewed from the thickness direction Td, the region on the second end side in the short-side direction Wd from the first inductor wire 20R and the region on the first end side in the short-side direction Wd from the second inductor wire 20L are the outer magnetic path 52. The material of the outer magnetic path 52 is a magnetic material the same as the material of the inner magnetic path 51.

In the present embodiment, the dimension of the first layer L1 in the thickness direction Td, i.e., the dimension of the first inductor wire 20R, the second inductor wire 20L, the first support wire 41, and the second support wire 42 in the thickness direction Td can be approximately 40 micrometers.

On the under surface that is the surface of the first layer L1 on the lower side in the thickness direction Td, a second layer L2 in a rectangular shape the same as the shape of the first layer L1 when viewed from the thickness direction Td is stacked. The second layer L2 is composed of two insulating resins 61 and an insulating resin magnetic layer 53.

The insulating resin 61 covers the first inductor wire 20R, the second inductor wire 20L, the first support wire 41, and the second support wire 42 from the lower side in the thickness direction Td. When viewed from the thickness direction Td, the insulating resin 61 has a shape that covers a range slightly wider than the outer edges of the first inductor wire 20R, the second inductor wire 20L, the first support wire 41, and the second support wire 42. As a result, the one insulating resin 61 is in a straight belt shape. The other insulating resin 61 has a band shape extending in a nearly L shape. The material of the insulating resin 61 is an insulating resin, and in this embodiment, a polyimide-based resin, for example, can be used. The insulating resin 61 has the insulating properties higher than those of the first inductor wire 20R and the second inductor wire 20L. Two insulating resins 61 are provided side by side in the short-side direction Wd corresponding to the number and the arrangement of the first inductor wire 20R and the second inductor wire 20L, and are connected to each other at the ends.

In the second layer L2, parts except the two insulating resins 61 are the insulating resin magnetic layer 53. The material of the insulating resin magnetic layer 53 is a magnetic material the same as the materials of the inner magnetic path 51 and the outer magnetic path 52 described above.

On the under surface that is the surface of the second layer L2 on the lower side in the thickness direction Td, a third layer L3 in a rectangular shape the same as the shape of the second layer L2 when viewed from the thickness direction Td is stacked. The third layer L3 is a first magnetic layer 54. Therefore, the first magnetic layer 54 is disposed on the lower side from the first inductor wire 20R and the second inductor wire 20L. The material of the first magnetic layer 54 is an organic resin containing metal magnetic powder the same as the materials of the inner magnetic path 51, the outer magnetic path 52, and the insulating resin magnetic layer 53.

On the other hand, on the top surface that is the surface of the first layer L1 on the upper side in the thickness direction Td, a fourth layer L4 in a rectangular shape the same as the shape of the first layer L1 when viewed from the thickness direction Td is stacked. The fourth layer L4 is formed of two first vertical wires 71, a second vertical wire 72, and a second magnetic layer 55.

The first vertical wire 71 is directly connected to the top surfaces of the first pads 22R and 22L in the first inductor wire 20R and the second inductor wire 20L with no other layer interposed therebetween. That is, to the first pad 22R, the first vertical wire 71, the first end of the first wire main body 21R, and the first support wire 41 are connected. To the first pad 22L, the first vertical wire 71, the first end of the second wire main body 21L, and the first support wire 41 are connected. The two first vertical wires 71 are disposed at positions in line symmetry relative to the symmetry axis AX. The first vertical wire 71 is made of a material the same as the materials of the first inductor wire 20R and the second inductor wire 20L. The first vertical wire 71 is in a regular quadrangular prism shape, and the axial direction of the regular quadrangular prism is matched with the thickness direction Td.

As shown in FIG. 21, when viewed in thickness direction Td, the dimensions of the edges of square-shaped first vertical wire 71 are slightly smaller than the dimensions of the edges of square-shaped first pads 22R and 22L. Therefore, the area of the first pads 22R and 22L is larger than the area of the first vertical wire 71 at the connection point to the first pads 22R and 22L. When viewed from above in the thickness direction Td, the center axis CV1 of the first vertical wire 71 is matched with the geometric center of the first pads 22R and 22L in a nearly square shape. Two first vertical wires 71 are provided corresponding to the number of the first pads 22R and 22L.

As shown in FIG. 20, the second vertical wire 72 is directly connected to the top surface of the second pad 23R in the first inductor wire 20R with no other layer interposed therebetween. That is, to the second pad 23, the second vertical wire 72, the second end of the first wire main body 21R, the second end of the second wire main body 21L, and the second support wire 42 are connected. The second vertical wire 72 is made of a material the same as the material of the first inductor wire 20R. The second vertical wire 72 is in a regular quadrangular prism shape, and the axial direction of the regular quadrangular prism is matched with the thickness direction Td.

As shown in FIG. 21, when viewed from the thickness direction Td, the dimensions of the edges of the square second vertical wire 72 are slightly smaller than the dimensions of the edges of the square second pad 23R. Therefore, the area of the second pad 23R is larger than the area of the second vertical wire 72 at the connection point to the second pad 23R. It should be noted that when viewed from the upper side in the thickness direction Td, the center axis CV2 of the second vertical wire 72 is matched with the geometric center of the second pad 23R in a nearly square shape. One second vertical wire 72 is provided corresponding to the number of the second pads 23R.

As shown in FIG. 20, in the fourth layer L4, parts except two first vertical wires 71 and one second vertical wire 72 are a second magnetic layer 55. Therefore, the second magnetic layer 55 is stacked on the top surfaces of the first inductor wire 20R, the second inductor wire 20L, and the support wires 41 and 42. That is, the support wires 41 and 42 are directly in contact with the second magnetic layer 55. The material of the second magnetic layer 55 is a material the same as the material of the first magnetic layer 54 described above.

In the inductor component 10, the magnetic layer 50 is composed of the inner magnetic path 51, the outer magnetic path 52, the insulating resin magnetic layer 53, the first magnetic layer 54, and the second magnetic layer 55. The inner magnetic path 51, the outer magnetic path 52, the insulating resin magnetic layer 53, the first magnetic layer 54, and the second magnetic layer 55 are connected to each other, and surround the first inductor wire 20R and the second inductor wire 20L. As described above, the magnetic layer 50 forms a closed magnetic circuit for the first inductor wire 20R and the second inductor wire 20L. Therefore, the first inductor wire 20R and the second inductor wire 20L extend in the inside of the magnetic layer 50. It should be noted that although the inner magnetic path 51, the outer magnetic path 52, the insulating resin magnetic layer 53, the first magnetic layer 54, and the second magnetic layer 55 are shown separately, these components are integrated as the magnetic layer 50, and a boundary is sometimes not confirmed.

On the top surface that is the surface of the fourth layer L4 on the upper side in the thickness direction Td, a fifth layer L5 in a rectangular shape the same as the shape of the fourth layer L4 when viewed from the thickness direction Td is stacked. The fifth layer L5 is composed of four terminal parts 80 and an insulating layer 90. Two of the four terminal parts 80 are first external terminals 81 electrically connected to the first inductor wire 20R or the second inductor wire 20L with the first vertical wire 71 interposed therebetween. One of the four terminal parts 80 is the second external terminal 82 electrically connected to the first inductor wire 20R and the second inductor wire 20L with the second vertical wire 72 interposed therebetween. The remaining one of the four terminal parts 80 except the first external terminals 81 and the second external terminal 82 is a dummy part 83 that is not electrically connected to any of the first inductor wire 20R and the second inductor wire 20L.

As shown in FIG. 21, when a virtual straight line BX passing the center of the fifth layer L5 in the long-side direction Ld and parallel with the short-side direction Wd is drawn, a point on the top surface of the fifth layer L5 at which the symmetry axis AX intersects with the virtual straight line BX is the geometric center G of the fifth layer L5. The four terminal parts 80 are disposed at two-fold rotational symmetry positions to the geometric center G of the fifth layer L5 when viewed from the thickness direction Td.

The first external terminal 81 is directly connected to the top surface of the first vertical wire 71 with no other layer interposed therebetween. The first external terminal 81 is in a rectangular shape when viewed from the thickness direction Td, and is also located on the second magnetic layer 55. The area of the first external terminal 81 in contact with the first vertical wire 71 is a half of the overall area of the first external terminal 81 or less. The long side of the rectangle of the first external terminal 81 extends in parallel with the long-side direction Ld of the fifth layer L5, and the short side extends in parallel with the short-side direction Wd of the fifth layer L5. Two first external terminals 81 are provided corresponding to the number of the first vertical wires 71.

The second external terminal 82 is directly connected to the top surface of the second vertical wire 72 with no other layer interposed therebetween. The area of the second external terminal 82 in contact with the second vertical wire 72 is a half of the overall area of the second external terminal 82 or less. The second external terminal 82 is in a rectangular shape when viewed from the thickness direction Td, and is also located on the second magnetic layer 55. The long side of the rectangle of the second external terminal 82 extends in parallel with the long-side direction Ld of the fifth layer L5, and the short side extends in parallel with the short-side direction Wd of the fifth layer L5.

Figure 22:
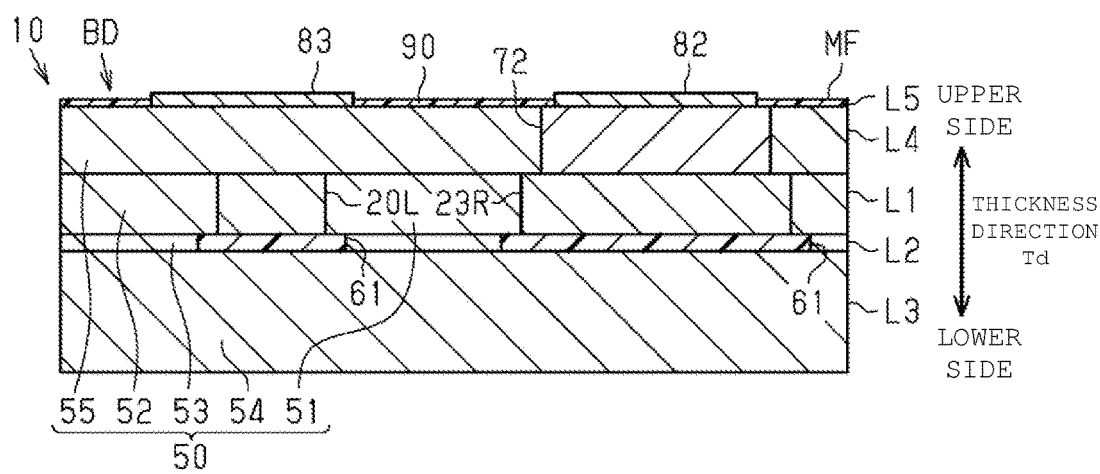
FIG. 22 is a sectional view of the inductor component taken along line 5-5 in FIG. 21.

As shown in FIG. 20, one of the four terminal parts 80 is a dummy part 83. As shown in FIG. 22, the dummy part 83 is disposed on the top surface of the second magnetic layer 55 of the fourth layer L4. As shown in FIG. 21, the dummy part 83 is in a shape different from the shapes of the first external terminal 81 and the second external terminal 82 when viewed from the thickness direction Td. In the present embodiment, the dummy part 83 is in an elliptical shape when viewed from the thickness direction Td. The shape of the dummy part 83 is not limited to this, and may be a rectangular shape, a circular shape, and any other shape as long as the shape is different from the shapes of the first external terminal 81 and the second external terminal 82, for example. The major axis of the ellipse of the dummy part 83 extends in parallel with the long-side direction Ld of the fifth layer L5, and the minor axis extends in parallel with the short-side direction Wd of the fifth layer L5.

When viewed from the thickness direction Td, most of the dummy part 83 overlaps with the second inductor wire 20L. More specifically, when viewed from the thickness direction Td, the dummy part 83 is disposed at a position overlapping with the connection part 33 of the second inductor wire 20L. When viewed from the thickness direction Td, the area of the dummy part 83 is the same as the areas of the first external terminal 81 and the second external terminal 82. It should be noted that in the present embodiment, "having the same area" permits manufacturing errors. Therefore, when the difference between the area of the dummy part 83 and the areas of the first external terminal 81 and the second external terminal 82 is within ±10%, it can be considered that the areas are equal.

The four terminal parts 80 is formed of a plurality of conductive layers. Specifically, the structure is a three-layer structure of copper, nickel, and gold. It should be noted that when viewed from the thickness direction Td, the second magnetic layer 55 and the first vertical wire 71 provided on the lower side in the thickness direction Td are sometimes seen through the first external terminal 81. The region in which the first vertical wire 71 is seen through the first external terminal 81 is a region a half of the first external terminal 81 or less when viewed from the thickness direction Td.

Similarly, in the second external terminal 82, the second magnetic layer 55 and the second vertical wire 72 provided on the lower side in the thickness direction Td are sometimes seen through. The region in which the second vertical wire 72 is seen through the second external terminal 82 is a region a half of the second external terminal 82 or less when viewed from the thickness direction Td.

In the dummy part 83, the second magnetic layer 55 provided on the lower side in the thickness direction Td is sometimes seen through. On the other hand, the region of the second magnetic layer 55 seen through from the first external terminal 81 is a half of the region of the first external terminal 81 or more. The region of the second magnetic layer 55 seen through from the second external terminal 82 is a half of the region of the second external terminal 82 or more. That is, when viewed from the thickness direction Td, the region of the overall dummy part 83 and the regions a half of the first external terminal 81 and the second external terminal 82 have optically the same color. Here, the same color is regarded as the same color when, for example, a difference between numerical values indicating RGB falls within a predetermined range with the use of a color difference meter. It should be noted that a predetermined range is 10%, for example.

In the fifth layer L5, parts except the terminal part 80 is the insulating layer 90. In other words, a range of the top surface of the fourth layer L4 that is not covered with the two first external terminals 81, the one second external terminal 82, and the one dummy part 83 is covered with the insulating layer 90 of the fifth layer L5. The insulating layer 90 has the insulating properties higher than those of the magnetic layer 50, and in the present embodiment, the insulating layer 90 is a solder resist. The dimension in the thickness direction Td of the insulating layer 90 is smaller than the dimension of any component of the terminal part 80 in the thickness direction Td.

In the present embodiment, an element body BD is composed of the magnetic layer 50, the insulating resin 61, and the insulating layer 90. That is, the element body BD is in a rectangular shape when viewed from the thickness direction Td. In the present embodiment, the dimension of the element body BD in the thickness direction Td is approximately 0.2 mm, for example.

In the surface of the element body BD, the surface of the insulating layer 90 on the upper side in the thickness direction Td is a principal surface MF. Therefore, the inductor wire 20 extends in parallel with the principal surface MF of the element body BD. The first vertical wire 71 extends in the thickness direction Td from the first pad 22R of the first inductor wire 20R toward the principal surface MF. Similarly, the first vertical wire 71 extends in the thickness direction Td from the first pad 22L of the second inductor wire 20L toward the principal surface MF. The first vertical wires 71 are both exposed from the principal surface MF.

From the second pad 23R, the second vertical wire 72 extends in the thickness direction Td toward the principal surface MF. The second vertical wire 72 is exposed from the principal surface MF. The top surface of the terminal part 80 is exposed from the principal surface MF, and is located on the upper side in the thickness direction Td from the principal surface MF. That is, the outer edges of the terminal parts 80 including the dummy part 83 are in contact with the insulating layer 90. It should be noted that as in the present embodiment, at least parts of the surfaces of the first vertical wire 71 and the second vertical wire 72 exposed from the principal surface MF are sometimes covered with the first external terminal 81 and the second external terminal 82.

The element body BD has a first side surface 93 vertical to the principal surface MF. It should be noted that the first side surface 91 of the first layer L1 is a part of the first side surface 93 of the element body BD. The element body BD has a second side surface 94 that is a side surface vertical to the principal surface MF and in parallel with the first side surface 93. It should be noted that the second side surface 92 of the first layer L1 is a part of the second side surface 94 the element body BD. That is, the first support wire 41 extends from the first inductor wire 20R in parallel with the principal surface MF, and has its end exposed from the first side surface 93 of the element body BD. Similarly, the second support wire 42 extends from the first inductor wire 20R in parallel with the principal surface MF, and has its end exposed from the second side surface 94 of the element body BD.

In the present embodiment, the geometric center G of the fifth layer L5 is matched with the geometric center G of the principal surface MF when viewed from the thickness direction Td. The geometric center G of the principal surface MF is matched with the geometric center G of the element body BD.

As shown in FIG. 21, it is assumed that the principal surface MF is virtually divided into a first region and a second region on a virtual straight line BX that passes the geometric center G of the principal surface MF and is in parallel with one side of the principal surface MF in the short-side direction Wd. When the region on the first end side in the long-side direction Ld from the virtual straight line BX is a first region, the dummy part 83 is not provided in the first region. When the region on the second end side in the long-side direction Ld from the virtual straight line BX is a second region, in the second region, the dummy parts 83 in the same number as the number of the second external terminals 82 provided in the second region are provided.

Next, the wires will be described in detail.

As shown in FIG. 21, when viewed from the thickness direction Td, the center axis C1 of the first wire main body 21R extends in the long-side direction Ld. It should be noted that the center axis C1 of the first wire main body 21R is a line that follows the intermediate points of the first wire main body 21R in the direction orthogonal to the direction in which the first wire main body 21R extends, i.e., in the short-side direction Wd.

As described above, the center axis C2 of the second wire main body 21L of the second inductor wire 20L extends in a nearly L shape. Here, the wire length of the long linear part 31 of the second wire main body 21L is longer than the wire length of the first wire main body 21R. In addition to this, the second wire main body 21L has the connection part 33 and the short linear part 32. Therefore, the wire length of the second wire main body 21L is longer than the wire length of the first wire main body 21R. Specifically, the wire length of the second wire main body 21L is 1.2 times or more the wire length of the first wire main body 21R.

The inductance value of the second inductor wire 20L is 1.1 times or more the inductance value of the first inductor wire 20R in the reflection of the difference in the wire length. In the present embodiment, the inductance value of the first inductor wire 20R is approximately 2.5 nH, for example.

The first wire main body 21R of the first inductor wire 20R extends along one side of the outer edge of the element body BD in the long-side direction Ld. The first pad 22L and the second pad 23R of the second inductor wire 20L are disposed at positions in symmetry to the geometric center G of the element body BD. In the present embodiment, the first pad 22L and the second pad 23R of the second inductor wire 20L are disposed at positions in two-fold symmetry to the geometric center G.

The first inductor wire 20R has parallel parts extending in parallel with the second inductor wire 20L. Specifically, the first wire main body 21R and the long linear part 31 of the second wire main body 21L correspond to the parallel parts. The first wire main body 21R and the long linear part 31 are arranged side by side in the short-side direction Wd in the first layer L1. It should be noted that the parallel parts may be substantially parallel, and a manufacturing error is permitted.

In the following description, a distance between the center axis C1 of the first wire main body 21R and the center axis C2 of the long linear part 31 of the second wire main body 21L in the short-side direction Wd orthogonal to the direction in which the parallel parts extend and in which the parallel parts are arranged side by side is defined as a pitch X1 between the wire main bodies. That is, the pitch between the wire main bodies is the pitch between adjacent parallel parts.

The gap between the adjacent parallel parts, i.e., the distance between the first end side in the short-side direction Wd of the first wire main body 21R and the second end side in the short-side direction Wd of the long linear part 31 of the second wire main body 21L is approximately 200 micrometers, for example.

As shown in FIG. 21, a distance from a center axis C1 of the first wire main body 21R, which is a parallel part located on the second end side in the short-side direction Wd, to an end of the element body BD in the short-side direction Wd closest to the first wire main body 21R, i.e., an end on the second end side is defined as a first distance Y1.

A distance from the center axis C2 of the long linear part 31, which is a parallel part located on the first end side in the short-side direction Wd, to an end of the element body BD in the short-side direction Wd closest to the long linear part 31, i.e., an end on the first end side is defined as a second distance Y2. In the present embodiment, the first distance Y1 has the same dimension as the second distance Y2.

In the short-side direction Wd, the pitch X1 between the wire main bodies is different in dimensions from the first distance Y1 and the second distance Y2. Specifically, the pitch X1 between the wire main bodies can be approximately "250 micrometers". The first distance Y1 and the second distance Y2 can be approximately "175 micrometers". As described above, the first distance Y1 and the second distance Y2 are preferably slightly longer than a half of the pitch X1.

It is assumed that a virtual tangent D1 is drawn as a tangent of the center axis C1 at a connection point between the first wire main body 21R and the first pad 22R to the center axis C1 of the first wire main body 21R when viewed from the thickness direction Td. In the present embodiment, the center axis C1 and the virtual tangent D1 are located on the same straight line.

The center axis A1 of the first support wire 41 connected to the first wire main body 21R extends in parallel with the virtual tangent D1. It should be noted that the center axis A1 of the first support wire 41 is a line that follows the intermediate points of the first support wire 41 in the direction orthogonal to the direction in which the first support wire 41 extends, i.e., in the short-side direction Wd.

The center axis A1 of the first support wire 41 is located on the outer side in the short-side direction Wd from the first virtual tangent D1. That is, the center axis A1 of the first support wire 41 and the virtual tangent D1 are located on different straight lines. The distance between the center axis A1 of the first support wire 41 and the virtual tangent D1 is 15 micrometers, for example.

When viewed from the thickness direction Td, the extension line of the center axis A1 of the first support wire 41 passes the center axis CV1 of the first vertical wire 71. That is, the extension line of the center axis A1 of the first support wire 41 passes the center of the connection surface of the first vertical wire 71 to the first pad 22R.

It is assumed that a virtual tangent D1 is drawn as a tangent of the center axis C2 at a connection point between the second wire main body 21L and the first pad 22L to the center axis C2 of the second wire main body 21L when viewed from the thickness direction Td.

The center axis A1 of the first support wire 41 connected to the second wire main body 21L extends in parallel with the virtual tangent D1. The center axis A1 of the first support wire 41 is located on the outer side in the short-side direction Wd from the virtual tangent D1. That is, the first support wire 41 extends from the first pad 22L in parallel with the virtual tangent D1, and is located on a straight line different from the center axis A1 of the first support wire 41 and the virtual tangent D1.

When viewed from the thickness direction Td, the extension line of the center axis A1 of the first support wire 41 passes the center axis CV1 of the first vertical wire 71. That is, the extension line of the center axis A1 of the first support wire 41 passes the center of the connection surface of the first vertical wire 71 to the first pads 22R and 22L. It should be noted that the first support wire 41 connected to the first wire main body 21R and the first support wire 41 connected to the second wire main body 21L are disposed at positions in line symmetry relative to the symmetry axis AX.

Similarly, it is assumed that a virtual tangent D2, which is a tangent to the center axis C1, is drawn at a site at which the center axis C1 of the first wire main body 21R is connected to the second pad 23R. In the present embodiment, the center axis C1 and the virtual tangent D2 are located on the same straight line. The center axis A2 of the second support wire 42 extends in parallel with the virtual tangent D2. It should be noted that the center axis A2 of the second support wire 42 is a line that follows the intermediate points of the second support wire 42 in the direction orthogonal to the direction in which the second support wire 42 extends, i.e., in the short-side direction Wd.

The center axis A2 of the second support wire 42 is located on the outer side in the short-side direction Wd from the virtual tangent D2. That is, the second support wire 42 extends from the second pad 23R in parallel with the virtual tangent D2, and is located on a straight line different from the center axis A2 of the second support wire 42 and the virtual tangent D2.

On the center axis A2 of the second support wire 42, the second vertical wire 72 is disposed. The extension line of the center axis A2 of the second support wire 42 passes the center axis CV2 of the second vertical wire 72. That is, the extension line of the center axis A2 of the second support wire 42 passes the center of the connection surface of the second vertical wire 72 to the second pad 23R.

The first support wire 41 and the second support wire 42 extending from the first inductor wire 20R are disposed at the same position in the short-side direction Wd. That is, the center axis A1 of the first support wire 41 and the center axis A2 of the second support wire 42 are located on the same straight line. It should be noted that similarly to the first embodiment, when a displacement is within 10% based on the minimum line width of the first inductor wire 20R and the second inductor wire 20L, the center axes A1 and A2 are regarded as located on the same straight line. Specifically, the minimum line width of the inductor wire 20 in the present embodiment can be 50 micrometers, which is the line width of the first wire main body 21R and the second wire main body 21L. Therefore, the term "located on the same straight line" in the present embodiment means the case in which the shortest distance between two axes is within five micrometers, and the term "located on the different straight line" means the case in which the shortest distance between two axes exceeds five micrometers.

As described above, in the first layer L1, the first support wires 41 are disposed in line symmetry relative to the symmetry axis AX. Therefore, as shown in FIG. 21, a distance Q1 from the end of the element body BD on the second end side in the short-side direction Wd to the center axis A1 of the first support wire 41 extending from the first inductor wire 20R is the same as a distance Q2 from the end of the element body BD on the first end side in the short-side direction Wd to the center axis A1 of the first support wire 41 extending from the second inductor wire 20L.

On the other hand, in the short-side direction Wd, the pitch P1 from the center axis A1 of the first support wire 41 extending from the first inductor wire 20R to the center axis A1 of the first support wire 41 extending from the second inductor wire 20L is larger than the distance Q1 and the distance Q2 described above. Specifically, the pitch P1 is a length approximately twice the distance Q1 and the distance Q2.

In the present embodiment, the sectional area of the first wire main body 21R in the section orthogonal to the center axis C1 of the first wire main body 21R is equal to the sectional area of the second wire main body 21L. In the present application, when the difference between the sectional areas of the first wire main body 21R and the second wire main body 21L is 10% or less to the sectional areas of the wire main bodies 21R, and 21L, the sectional areas are regarded as equal.

The sectional area of the first support wire 41 in the section orthogonal to the center axis A1 of the first support wire 41 is smaller than the sectional areas of the first wire main body 21R and the second wire main body 21L described above. The sectional area of the second support wire 42 in the section orthogonal to the center axis A2 of the second support wire 42 is also smaller than the sectional areas of the first wire main body 21R and the second wire main body 21L described above.

Figure 23:
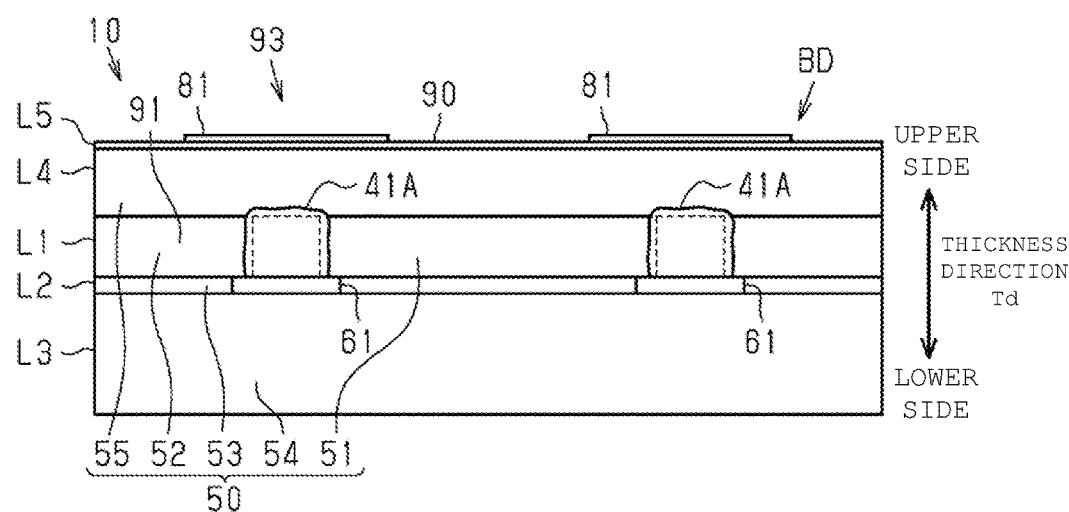
FIG. 23 is a side view showing a first side surface of the inductor component according to the second embodiment.

As shown in FIG. 23, the ends of the two first support wires 41 are exposed from the first side surface 93 of the element body BD on the first end side in the long-side direction Ld. The shape of the exposed surface 41A of each first support wire 41 exposed from the first side surface 93 is a shape in which the sectional shape of the first support wire 41 orthogonal to the center axis A1 is slightly extended in the short-side direction Wd. As a result, the area of the exposed surface 41A of the first support wire 41 is larger than the sectional area of the first support wire 41 in the inside of the element body BD in the section orthogonal to the center axis A1. Similarly, as shown in FIG. 20, the area of the exposed surface 42A of the second support wire 42 exposed from the second side surface 94 is larger than the sectional area of the second support wire 42 in the inside of element body BD in the section orthogonal to the center axis A2. As a result, the contact areas of the first support wire 41 and the second support wire 42 with the first side surface 93 and the second side surface 94 of the element body BD are increased, and the close contact property to each other is improved. It should be noted that the size of the sectional area only has to satisfy the relationship above, and for example, the exposed surface 41A may be in a shape in which the exposed surface 41A extends to one side and another side is covered with the extending part of the element body BD.

It should be noted that the number of the first support wires 41 exposed from the first side surface 93 is two, the number of the second support wires 42 exposed from the second side surface 94 is one, and the number of the exposed support wires is different.

A manufacturing method for an inductor component 10 according to the second embodiment will be described. In the manufacturing method for an inductor component 10 according to the second embodiment, points different from the manufacturing method for an inductor component 10 according to the first embodiment will be described below.

In the insulating layer forming step in the second embodiment, on parts on which the terminal part 80 is not formed on the top surface of the second magnetic layer 55 and the top surfaces of the vertical wires 71 and 72, a solder resist that functions as the insulating layer 90 is patterned by photolithography. It should be noted that in the present embodiment, the direction orthogonal to the top surface of the insulating layer 90, i.e., the principal surface MF of the element body BD is the thickness direction Td.

In the terminal part forming step in the second embodiment, on the parts that are not covered with the insulating layer 90 on the top surface of the second magnetic layer 55 and the top surfaces of the vertical wires 71 and 72, the first external terminal 81, the second external terminal 82, and the dummy part 83 are formed. In these metal layers, copper, nickel, and gold are formed by electroless plating. Between copper and nickel, a catalyst layer such as palladium may be provided. Thus, the first external terminal 81, the second external terminal 82, and the dummy part 83 in the three-layer structure are formed.

Figure 24:
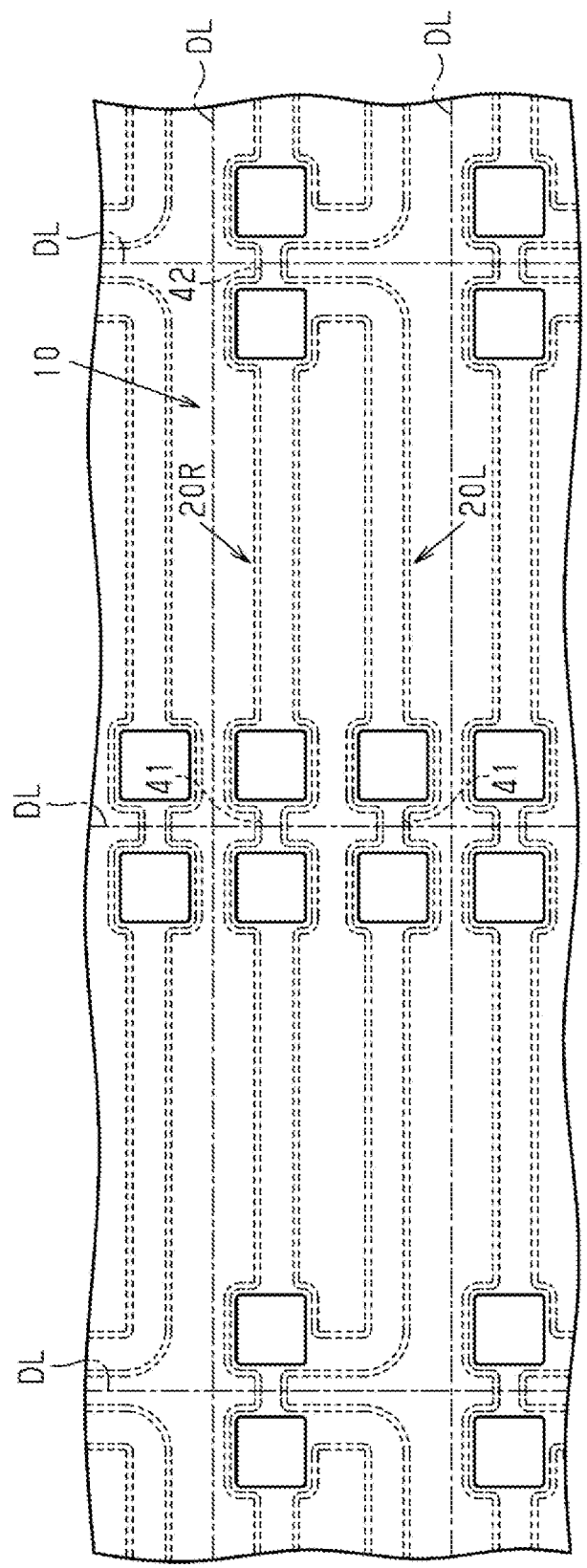
FIG. 24 is an explanatory diagram of a manufacturing method for an inductor component according to the second embodiment.

In the dicing step according to the second embodiment, as shown in FIG. 24, die separation is performed by cutting with a dicing machine at break lines DL. As a result, the inductor component 10 can be obtained.

In the state before cutting with a dicing machine, for example, as shown in FIG. 24, a plurality of inductor components is arranged side by side in the long-side direction Ld and the short-side direction Wd, and the individual inductor components are connected with the element body BD, the first support wire 41, and the second support wire 42. Specifically, the first support wire 41 is connected to each other, and the second support wire 42 is connected to each other. The first support wires 41 and the second support wires 42 included on the break lines DL are cut in the thickness direction Td, and the section of the first support wire 41 is exposed as the exposed surface 41A from the first side surface 93. The section of the second support wire 42 is exposed as the exposed surface 42A to the second side surface 94.

Next, the effects of the second embodiment will be described. The inductor component 10 according to the second embodiment exerts the effects below in addition to the effects (1-1) to (1-4), and (1-6) to (1-10), and (1-12) to (1-17) of the first embodiment.

(2-1) In the second embodiment, the number of support wires exposed from the first side surface 93 of the inductor component 10 is two, and the number of support wires exposed from the second side surface 94 is one. That is, the number of support wires exposed from the second side surface 94 is reduced. Since the number of support wires is small, a load applied to the inductor component 10 at the time of cutting with a dicing machine can be reduced.

(2-2) In the embodiment, the wire length of the first wire main body 21R is different from the wire length of the second wire main body 21L. Therefore, the inductance value can be switched to a different inductance value depending on which of the first pad 22R and the first pad 22L an electric current is flowed.

(2-3) In the second embodiment, the dummy part 83 is provided on the fifth layer L5. When viewed from the thickness direction Td, the area of the dummy part 83 is equal to the areas of the first external terminal 81 and the second external terminal 82. Therefore, when the dummy part 83 is soldered to the substrate or the like in the same manner as the first external terminal 81 and the second external terminal 82, the amount of solder applied to these four terminal parts 80 can be made uniform. Therefore, it is possible to suppress mounting the inductor component 10 on a substrate or the like in an inclined from.

The first embodiment and the second embodiment can be modified and implemented as follows. The first embodiment, the second embodiment, and exemplary modifications below can be implemented in combination within a range that is not technically contradictory.

The number of inductor wires in the inside of element body BD may be one. Three or more inductor wires may be provided. The number of support wires exposed from the first side surface 93 and the second side surface 94 may be three or more corresponding to the number of inductor wires.

Figure 25:
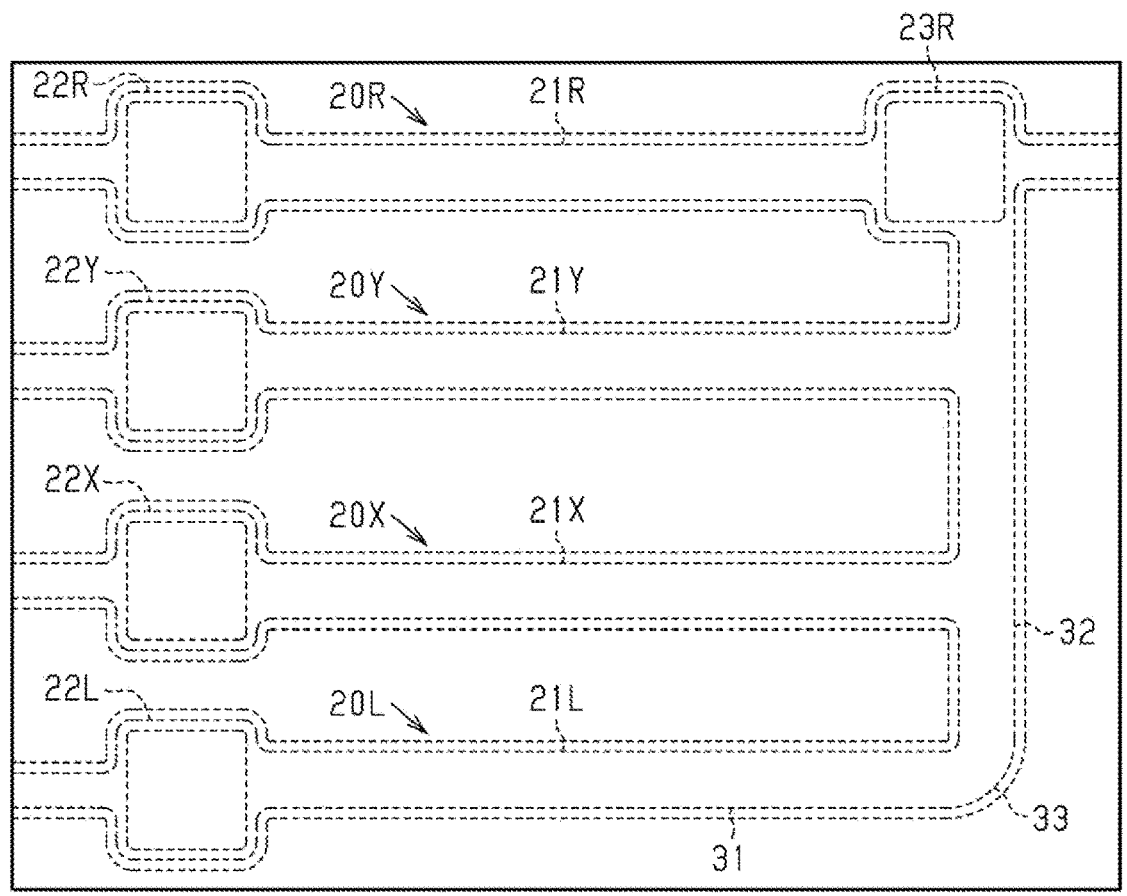
FIG. 25 is a transparent top view of an inductor component according to an exemplary modification.

In an example shown in FIG. 25, a third inductor wire 20X and a fourth inductor wire 20Y are provided in addition to the first inductor wire 20R and the second inductor wire 20L. The third wire main body 21X of the third inductor wire 20X extends in parallel with the first wire main body 21R of the first inductor wire 20R. The third wire main body 21X is disposed between the first wire main body 21R and the long linear part 31 of the second wire main body 21L. The first end of the third wire main body 21X is connected to the short linear part 32 of the second wire main body 21L. That is, the third inductor wire 20X shares a part of the wire with the second inductor wire 20L. To the second end of the third wire main body 21X, a first pad 22X is connected.

The fourth wire main body 21Y of the fourth inductor wire 20Y extends in parallel with the first wire main body 21R of the first inductor wire 20R. The fourth wire main body 21Y is disposed between the first wire main body 21R and the third wire main body 21X. The first end of the fourth wire main body 21Y is connected to the short linear part 32 of the second wire main body 21L. That is, the fourth inductor wire 20Y shares a part of the wire with the second inductor wire 20L. A first pad 22Y is connected to the second end of the fourth wire main body 21Y.

According to the configuration of this modified example, by switching which of the first pad 22R, the first pad 22L, the first pad 22X, and the first pad 22Y an electric current is carried through, a desired inductance value can be obtained from four different inductance values.

Figure 26:
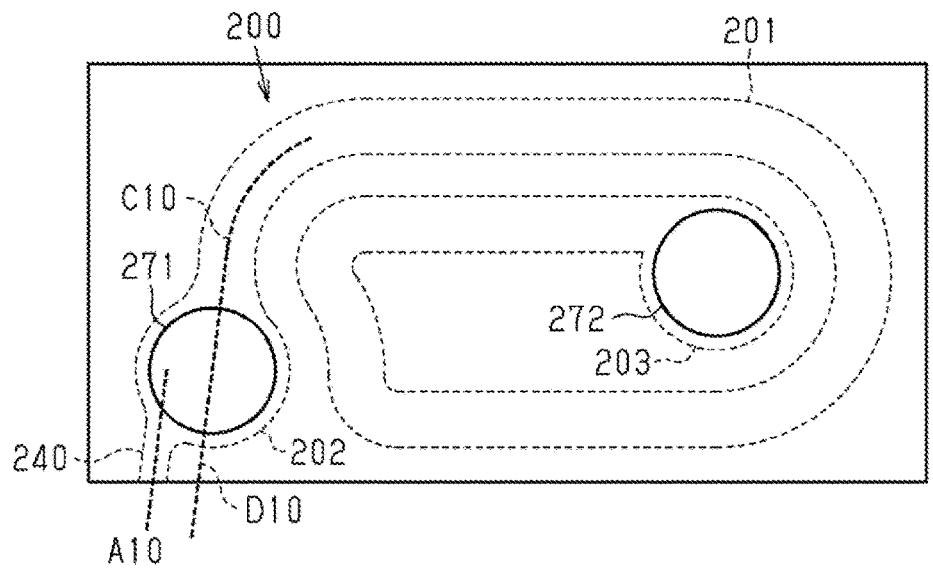
FIG. 26 is a transparent top view of an inductor component according to an exemplary modification.

The shape of the inductor wire is not limited to the examples of the foregoing embodiments. For example, the wire main body of the inductor wire may be in a spiral shape. In the example shown in FIG. 26, when viewed in the thickness direction Td, a wire main body 201 of an inductor wire 200 extends clockwise from the radially outer side toward the radially inner side. In this example, the number of turns of the wire main body 201 is 1.25. To the first end of the wire main body 201, a first pad 202 is connected. To the second end of the wire main body 201, a second pad 203 is connected. The first pad 202 and the second pad 203 are in a circular shape when viewed in the thickness direction Td. To the first pad 202, an external terminal is connected with a first vertical wire 271 interposed therebetween. To the second pad 203, an external terminal is connected with the second vertical wire 272 interposed therebetween. It should be noted that external terminals are omitted in FIG. 26.

From the first pad 202 on the opposite side of the wire main body 201, a support wire 240 extends. When a virtual tangent D10 is drawn at a connection point to the first pad 202 with respect to the center axis C10 of the wire main body 201, a center axis A10 of the support wire 240 is in parallel with the virtual tangent D10. In addition, the center axis A10 of the support wire 240 is located on the outer side in the radial direction of the wire main body 201 from the virtual tangent D10. That is, the center axis A10 of the support wire 240 and the virtual tangent D10 are located on different straight lines.

In the foregoing embodiments, the center axis A1 of the first support wire 41 and the center axis A2 of the second support wire 42 may be located on different straight lines. The arrangement of the support wires can be appropriately changed corresponding to the shapes and the like of the first pad 22 and the second pad 23.

The area of the exposed surface 41A of the first support wire 41 may become equal to the sectional area of the first support wire 41 in the inside of element body BD by a method of cutting with a dicing machine or a process after cutting with a dicing machine. For example, when the first side surface 91 including the exposed surface 41A is polished after cutting with a dicing machine, the shape of the exposed surface 41A becomes the same as the sectional shape of the first support wire 41 in the inside of element body BD, and thus, the sectional areas of both become the same. At this point, the same applies to the second support wire 42.

In the foregoing embodiments, the mean particle size of the metal magnetic powder contained in the magnetic layer 50 is not limited to the examples of the foregoing embodiments. However, in order to ensure the relative permeability, the mean particle size of the metal magnetic powder is preferably one micrometer or more and ten micrometers or less (i.e., from one micrometer to ten micrometers).

In the foregoing embodiments, the second support wire 42 may be omitted. In this case, no support wire exposed from the second side surface 94 is absent.

In the first embodiment, the wire width W1 of the first support wire 41 in the short-side direction Wd may be the same as the wire width H1 of the inductor wire 20 in the short-side direction Wd of the wire main body 21. In this case, the sectional area of the first support wire 41 is substantially the same as the sectional area of the wire main body 21. The wire width W1 may be larger than the wire width H1. At this point, the same applies to the second support wire 42.

In the foregoing embodiments, the metal magnetic powder included in the first magnetic layer 54 and the second magnetic layer 55 does not necessarily have to be the metal magnetic powder containing Fe. For example, a metal magnetic powder containing Ni or Cr may be used.

In the foregoing embodiments, the minimum gap between the inductor wires adjacent to each other does not necessarily have to be provided between the pads, and may be provided between the wire main bodies 21. However, from the viewpoint of insulation between the inductor wires 20, the minimum gap is preferably 50 micrometers or more. Furthermore, a particle size of approximately 100 micrometers or more is still preferable.

In the foregoing embodiments, the material of a part including the exposed surface 41A of the first support wire 41 and the material of a part including the exposed surface 42A of the second support wire 42 do not necessarily have to be a Cu oxide. In the case in which a Cu alloy is used as the first support wire 41 and the second support wire 42, it is preferable to adopt a Cu alloy oxide as a material of a part including the exposed surfaces. On the exposed surface 41A of the first support wire 41 and the exposed surface 42A of the second support wire 42, an insulating layer made of a resin may be stacked.

In the foregoing embodiments, the material forming the first support wire 41 and the second support wire 42 may be directly exposed from the exposed surfaces 41A.

In the foregoing embodiments, the dimension of the element body BD in the thickness direction Td is not limited to the examples of the foregoing embodiments. However, as described above, the smaller the dimension of the element body BD in the thickness direction Td becomes, the smaller the dimension protruding from the substrate in mounting the inductor component 10 on the substrate becomes, which is preferable. Specifically, the thickness may be preferably 0.25 mm or less.

In the foregoing embodiments, the dimension of the first layer L1, i.e., the inductor wire 20 in the thickness direction Td is not limited to the examples of the foregoing embodiments. However, as described above, the ratio is preferably one-tenth or more and one-third or less (i.e., from one-tenth to one-third) with respect to the dimension of the element body BD in the thickness direction Td.

In the foregoing embodiments, the pitch P1 from the center axis A1 of the first support wire 41 extending from the first inductor wire 20R to the center axis A1 of the first support wire 41 extending from the second inductor wire 20L is not limited to the examples of the foregoing embodiments. For example, the pitch P1, the distance Q1, and the distance Q2 may be disposed to be equal to each other. In addition, the distance Q1 and the distance Q2 may be different.

In the foregoing embodiments, the compositions of the first inductor wire 20R and the second inductor wire 20L are not limited to the examples of the foregoing embodiments. For example, silver or gold may be used. The compositions of the first support wire 41 and the second support wire 42 are also not limited to the examples of the foregoing embodiments.

In the foregoing embodiments, the composition of the magnetic layer 50 is not limited to the examples of the foregoing embodiments. For example, the material of the magnetic layer 50 may be ferrite powder or a mixture of ferrite powder and metal magnetic powder.

In the foregoing embodiments, another layer may be interposed between the support wires 41 and 42 and the magnetic layer 50. For example, an insulating layer may be interposed between the support wires 41 and 42 and the magnetic layer 50.

In the foregoing embodiments, the first inductor wire 20R and the second inductor wire 20L may be disposed at different positions in the thickness direction Td in the element body BD. That is, when viewed from the thickness direction Td, the first inductor wire 20R and the second inductor wire 20L may be disposed at positions overlapping with each other, and the first inductor wire 20R and the second inductor wire 20L may be connected to the same first vertical wire 71 and the same second vertical wire 72.

In the first embodiment, the inductor wire 20 does not necessarily have to be in a linear shape. In order to acquire a suitable inductance value at the time of use, a connection part may be provided. It should be noted that a plurality of connection parts may be provided on the inductor wire 20. Also in the second embodiment, the first inductor wire 20R does not necessarily have to be in a linear shape, and the second inductor wire 20L may be provided with a plurality of connection parts.

In the foregoing embodiments, the extension line of the center axis A1 of the first support wire 41 and the extension line of the center axis A2 of the second support wire 42 do not necessarily have to pass through the center of the connection surface of the vertical wires 71 and 72 to the pads 22 and 23.

In the foregoing embodiments, the areas of the first pads 22R and 22L and the second pad 23R may be equal to the areas of the first vertical wires 71 and the second vertical wires 72 when viewed from the thickness direction Td. The dimensions of the lengths of the first pads 22R and 22L and the second pad 23R in the direction orthogonal to the direction of extending the wire main body may be the same as that of the wire main body.

In the foregoing embodiments, the first external terminal 81 and the second external terminal 82 may be omitted. When the first vertical wire 71 and the second vertical wire 72 are exposed from the principal surface MF, an electric current can be carried directly from the first vertical wire 71 and the second vertical wire 72 to the inductor wire 20. In this case, the part of the first vertical wire 71 exposed from the principal surface MF and the part of the second vertical wire 72 exposed from the principal surface MF function as external terminals.

In the foregoing embodiments, the outer surfaces of the first external terminal 81 and the second external terminal 82 may be covered with an insulating layer. In this case, in the state in which the inductor component 10 before being mounted on a substrate or the like is stored, it is possible to suppress carrying an unintentional current through the inside of the inductor component 10 with the external terminals interposed therebetween. In the case of this modification, before the inductor component 10 is mounted on a substrate or the like, cleaning or the like only has to be performed to remove the insulating layer covering the first external terminal 81 and the second external terminal 82.

In the second embodiment, the dummy part 83 does not necessarily have to have the same stacked structure as the first external terminal 81 and the second external terminal 82. For example, the dummy part 83 does not necessarily have to be a material having conductivity. For example, the dummy part 83 may be a part of the second magnetic layer 55 that is exposed from the insulating layer 90.

In the second embodiment, the area of the dummy part 83 when viewed from the thickness direction Td may be different from the areas of the first external terminal 81 and the second external terminal 82.

In the second embodiment, the dummy part 83 may does not necessarily have to be provided.

In the second embodiment, the dummy part may be provided in the first region. The virtual straight line BX may be drawn in parallel with the long-side direction Ld.

In the embodiment, the manufacturing method for an inductor component 10 is not limited to the examples of the foregoing embodiments. For example, in the first embodiment and the second embodiment, the step of forming the inductor wire 20 and the step of forming the first support wire 41 and the second support wire may be different steps. For example, after the inductor wire 20 is formed, the support wires 41 and 42 may be formed of a material different from that of the inductor wire 20.

What is claimed is:

1. An inductor component comprising:
   an element body having a principal surface and a side surface vertical to the principal surface;
   an inductor wire extending in the element body in parallel with the principal surface;
   a vertical wire extending from the inductor wire in a thickness direction toward the principal surface, the vertical wire being exposed from the principal surface; and
   a support wire extending from the inductor wire in parallel with the principal surface, the support wire having an end portion exposed from the side surface, wherein
   the inductor wire has
     a wire main body that linearly extends, and
     a pad provided at an end portion of the wire main body, the pad being connected to the vertical wire and the support wire,
   the support wire is disposed on the pad on an opposite side of the wire main body,
   when viewed from the thickness direction, and when a virtual tangent is drawn to a center axis of the wire main body at a connecting site of the wire main body to the pad,
   the support wire extends from the pad in parallel with the virtual tangent, and
   a center axis of the support wire and the virtual tangent are located on different straight lines.

2. The inductor component according to claim 1, wherein the pad includes a first pad and a second pad,
   the side surface includes a first side surface and a second side surface in parallel with each other,
   the support wire includes a first support wire and a second support wire, the first pad is provided at a first end portion of the wire main body, the second pad is provided at a second end portion of the wire main body, the first support wire extends from the first pad, the second support wire extends from the second pad, the first support wire is exposed from the first side surface, and the second support wire is exposed from the second side surface.

3. The inductor component according to claim 2, wherein a center axis of the first support wire and a center axis of the second support wire are located on a same one of the straight lines when viewed from the thickness direction.

4. The inductor component according to claim 1, wherein a sectional area of the support wire in a section orthogonal to a center axis of the support wire is smaller than a sectional area of the wire main body in a section orthogonal to the center axis of the wire main body.

5. The inductor component according to claim 1, wherein an area of an exposed surface of the support wire exposed from the side surface is larger than a sectional area of the support wire located in the element body, the sectional area being a section orthogonal to a center axis of the support wire.

6. The inductor component according to claim 1, wherein a plurality of the inductor wires is present on an identical plane, and a plurality of the support wires corresponding to the individual inductor wires is present, a plurality of the support wires is exposed from the first side surface of the side surfaces of the element body, and when a direction along the first side surface and orthogonal to the thickness direction is defined as a first direction, a minimum pitch of pitches of the support wires adjacent to each other in the first direction is equal to or greater than a minimum distance of distances from the support wires to ends of the first side surface in the first direction.

7. The inductor component according to claim 1, wherein an extension line of the center axis of the support wire passes a center of a connection surface of the vertical wire to the pad when viewed from the thickness direction.

8. The inductor component according to claim 1, wherein a part of the support wire including an exposed surface exposed from the element body is a Cu oxide or a Cu alloy oxide.

9. The inductor component according to claim 1, wherein the side surface includes a first side surface and a second side surface parallel with each other, a plurality of the inductor wires is present on an identical plane, and a plurality of the support wires corresponding to the inductor wires is present, the plurality of support wires is exposed from any one of the first side surface or the second side surface, and a number of the support wires exposed from the first side surface is different from a number of the support wires exposed from the second side surface.

10. The inductor component according to claim 1, wherein a first magnetic layer is stacked on a side opposite to the principal surface from the inductor wire in the element body, and a second magnetic layer is stacked on the principal surface side of the inductor wire in the element body.

11. The inductor component according to claim 10, wherein the first magnetic layer and the second magnetic layer are organic resins containing metal magnetic powder.

12. The inductor component according to claim 11, wherein the metal magnetic powder contained in the first magnetic layer and the second magnetic layer is an Fe-based metal powder, and a mean particle size of the metal magnetic powder is from 1 micrometer to 10 micrometers.

13. The inductor component according to claim 1, wherein the element body includes a magnetic layer, and the support wire is directly in contact with the magnetic layer.

14. The inductor component according to claim 1, wherein the pad includes a first pad and a second pad, the vertical wire includes a first vertical wire and a second vertical wire, the first pad is provided at a first end of the wire main body, the second pad is provided at a second end of the wire main body, the first vertical wire is directly connected from the first pad, and the second vertical wire is directly connected from the second pad.

15. The inductor component according to claim 1, wherein the wire main body extends linearly.

16. The inductor component according to claim 1, wherein when viewed from the thickness direction, an area of the pad is larger than an area of the vertical wire at a connection point to the pad.

17. The inductor component according to claim 1, wherein a dimension of the element body in the thickness direction is 0.25 mm or less, and a dimension of the inductor wire in the thickness direction and a dimension of the support wire in the thickness direction are from one-tenth to one-third of the dimension of the element body in the thickness direction.

18. The inductor component according to claim 1, wherein a plurality of the inductor wires is present on an identical plane, and a minimum gap between the inductor wires adjacent to each other is 50 micrometers or more.

19. The inductor component according to claim 1, comprising:

a plurality of terminal parts exposed from the principal surface, wherein at least one of the terminal parts is an external terminal electrically connected to the inductor wire, another terminal part of the terminal parts other than the external terminal is a dummy part that is not electrically connected to the inductor wire, a shape of the dummy part is different from a shape of the external terminal, and when viewed from the thickness direction, an area of the dummy part is equal to an area of the external terminal.

20. A manufacturing method for an inductor component, the method comprising:

forming a plurality of inductor wires having a wire main body extending linearly and a pad provided at an end of the wire main body and a plurality of support wires connecting the pads of the inductor wires that are different on an identical plane;

forming a vertical wire connected to the pad in a thickness direction perpendicular to a plane on which the plurality of inductor wires and the plurality of support wires are formed;

forming an element body covering the inductor wire and the support wire; and cutting the element body in the thickness direction at a position at which the support wire is provided to expose a cut surface of the support wire from a side surface of the element body, and obtaining an inductor component including at least one of the inductor wires in the element body, wherein when a virtual tangent is drawn at a connection point of the wire main body to the pad with respect to a center axis of the wire main body with respect to the inductor wire to be formed when viewed in the thickness direction, the support wire is provided from the pad in parallel with the virtual tangent such that a center axis of the support wire and the virtual tangent are located on different straight lines.

* * * * *